US008433504B2

(12) United States Patent
Hayashida et al.

(10) Patent No.: US 8,433,504 B2
(45) Date of Patent: Apr. 30, 2013

(54) TRAFFIC INFORMATION GENERATION METHOD, TRAFFIC INFORMATION GENERATION DEVICE, AND NAVIGATION SYSTEM

(75) Inventors: Teruhide Hayashida, Tokyo (JP); Tomoyuki Zaitsu, Okazaki (JP); Kazutaka Yoshikawa, Okazaki (JP); Kenji Nagase, Okazaki (JP); Hiroki Ishikawa, Anjo (JP)

(73) Assignees: Toyota Jidosha Kabushiki Kaisha, Toyota (JP); Aisin Aw Co., Ltd., Anjo (JP)

( * ) Notice: Subject to any disclaimer, the term of this patent is extended or adjusted under 35 U.S.C. 154(b) by 673 days.

(21) Appl. No.: 12/450,657

(22) PCT Filed: Aug. 22, 2008

(86) PCT No.: PCT/JP2008/065018
§ 371 (c)(1),
(2), (4) Date: Oct. 5, 2009

(87) PCT Pub. No.: WO2009/025359
PCT Pub. Date: Feb. 26, 2009

(65) Prior Publication Data
US 2010/0138141 A1      Jun. 3, 2010

(30) Foreign Application Priority Data

Aug. 22, 2007 (JP) ................................. 2007-216273

(51) Int. Cl.
*G01C 1/00* (2006.01)
(52) U.S. Cl.
USPC ........... 701/118; 701/117; 701/119; 701/517; 340/917; 340/933; 340/988; 340/992; 340/995.13

(58) Field of Classification Search .................. 701/119, 701/117, 118, 517; 340/992, 988, 917, 933, 340/995.13
See application file for complete search history.

(56) References Cited

U.S. PATENT DOCUMENTS 5,283,573 A    2/1994  Takatou et al.
5,899,953 A *  5/1999  Urahashi ...................... 701/117

(Continued)

FOREIGN PATENT DOCUMENTS

JP    A-9-128682      5/1997
JP    A-2003-148973   5/2003

(Continued)

OTHER PUBLICATIONS

Office Action issued in U.S. Appl. No. 12/307,968 dated May 26, 2011.

(Continued)

*Primary Examiner* — McDieunel Marc
(74) *Attorney, Agent, or Firm* — Oliff & Berridge, PLC

(57) ABSTRACT

A traffic information generation method for generating traffic information for each link includes a vehicle speed detection step of detecting a vehicle speed at predetermined distance intervals or at predetermined time intervals using a vehicle speed sensor; and a traffic jam degree detection step of referring to a specified speed and a specified distance prescribed in association with a traffic jam degree representing a level of a traffic jam and a connection determination distance prescribed in accordance with a road type to detect the traffic jam degree corresponding to the vehicle speed. When a link length falls within a predetermined range, information on the traffic jam degree corresponding to a fastest vehicle speed within a prescribed starting point distance from a beginning of the link is allocated to the link.

8 Claims, 17 Drawing Sheets

U.S. PATENT DOCUMENTS

| | | |
|---|---|---|
| 6,650,948 B1 | 11/2003 | Atkinson et al. |
| 7,366,606 B2 * | 4/2008 | Uyeki .......................... 701/117 |
| 8,005,609 B2 * | 8/2011 | Uyeki et al. ................. 701/117 |
| 2005/0093720 A1 | 5/2005 | Yamane et al. |
| 2005/0222751 A1 * | 10/2005 | Uyeki .......................... 701/117 |
| 2007/0010934 A1 * | 1/2007 | Breitenberger et al. ...... 701/117 |
| 2011/0160989 A1 * | 6/2011 | Uyeki et al. ................. 701/119 |

FOREIGN PATENT DOCUMENTS

| | | |
|---|---|---|
| JP | A-2003-281674 | 10/2003 |
| JP | A-2005-259116 | 9/2005 |
| JP | A-2005-285108 | 10/2005 |
| JP | A-2005-301643 | 10/2005 |
| JP | A-2005-316739 | 11/2005 |
| JP | A-2006-23975 | 1/2006 |
| JP | A-2006-79504 | 3/2006 |
| JP | A-2006-189561 | 7/2006 |
| JP | A-2008-20948 | 1/2008 |

OTHER PUBLICATIONS

U.S. Appl. No. 12/307,968, filed Apr. 21, 2009 in the name of Toshio Inoguchi.

Nov. 8, 2011 Office Action issued in U.S. Appl. No. 12/307,968.

* cited by examiner

FIG.4
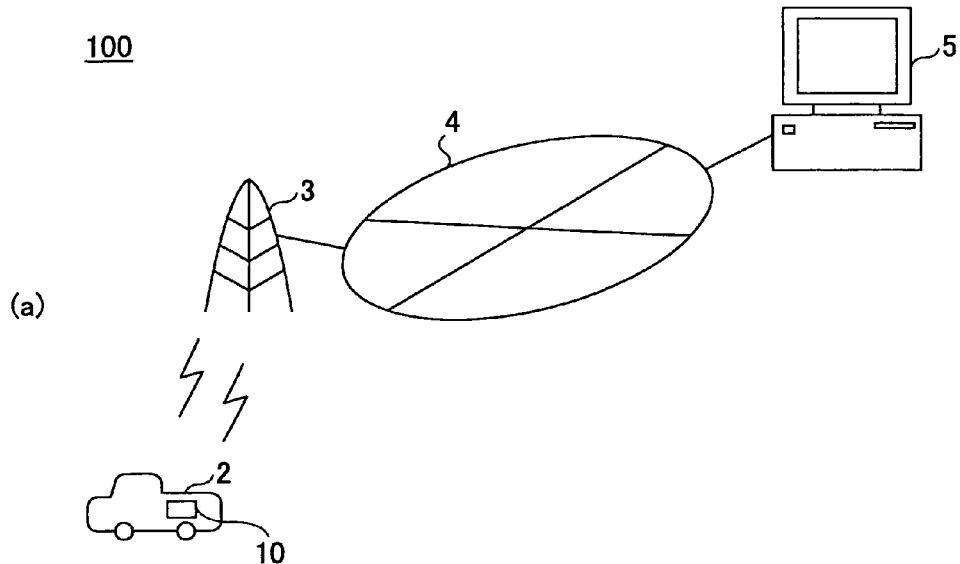
(a)
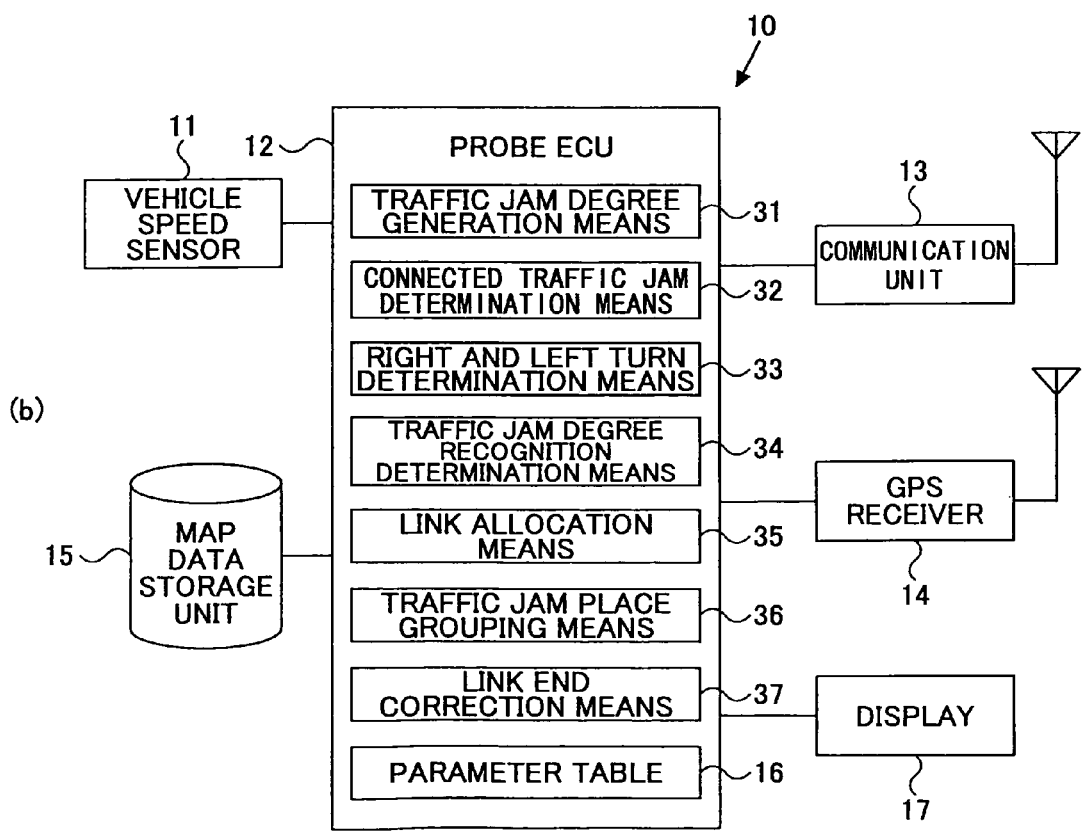
(b)

FIG.6

| ROAD TYPE | TRAFFIC JAM DEGREE | SET VEHICLE SPEED (FOR Step 1) | CONNECTED TRAFFIC JAM DETERMINATION DISTANCE (FOR Step 2) | TRAFFIC JAM DEGREE RECOGNITION DETERMINATION VALUE (FOR Step 3) | PARTIAL TRAFFIC JAM GENERATION A LINK LENGTH (FOR Step 4) | LINK END CORRECTION RANGE (FOR Step 5) |
|---|---|---|---|---|---|---|
| FREEWAY | V NO TRAFFIC JAM | H Km/h OR LOWER | - | - | - | |
| | IV LESS CONGESTION | F Km/h OR LOWER | L5 Km/h OR LOWER | L5 Km/h OR LOWER | L5 Km/h OR LOWER | L1 Km/h OR LOWER |
| | III HEAVY CONGESTION | E Km/h OR LOWER | L5 Km/h OR LOWER | L5 Km/h OR LOWER | L5 Km/h OR LOWER | L1 Km/h OR LOWER |
| | II LESS TRAFFIC JAM | J Km/h OR LOWER | L4 Km/h OR LOWER | L5 Km/h OR LOWER | L5 Km/h OR LOWER | L1 Km/h OR LOWER |
| | I HEAVY TRAFFIC JAM | D Km/h OR LOWER | L2 Km/h OR LOWER | L3 Km/h OR LOWER | L5 Km/h OR LOWER | L1 Km/h OR LOWER |
| TOLLWAY | V NO TRAFFIC JAM | G Km/h OR LOWER | - | - | - | |
| | IV LESS CONGESTION | J Km/h OR LOWER | L4 Km/h OR LOWER | L5 Km/h OR LOWER | L5 Km/h OR LOWER | L1 Km/h OR LOWER |
| | III HEAVY CONGESTION | I Km/h OR LOWER | L3 Km/h OR LOWER | L5 Km/h OR LOWER | L5 Km/h OR LOWER | L1 Km/h OR LOWER |
| | II LESS TRAFFIC JAM | D Km/h OR LOWER | L2 Km/h OR LOWER | L3 Km/h OR LOWER | L5 Km/h OR LOWER | L1 Km/h OR LOWER |
| | I HEAVY TRAFFIC JAM | B Km/h OR LOWER | L2 Km/h OR LOWER | L3 Km/h OR LOWER | L5 Km/h OR LOWER | L1 Km/h OR LOWER |
| PUBLIC HIGHWAY | V NO TRAFFIC JAM | E Km/h OR LOWER | - | - | - | - |
| | IV LESS CONGESTION | D Km/h OR LOWER | L2 Km/h OR LOWER | L3 Km/h OR LOWER | L5 Km/h OR LOWER | L1 Km/h OR LOWER |
| | III HEAVY CONGESTION | C Km/h OR LOWER | L2 Km/h OR LOWER | L3 Km/h OR LOWER | L5 Km/h OR LOWER | L1 Km/h OR LOWER |
| | II LESS TRAFFIC JAM | B Km/h OR LOWER | L2 Km/h OR LOWER | L3 Km/h OR LOWER | L5 Km/h OR LOWER | L1 Km/h OR LOWER |
| | I HEAVY TRAFFIC JAM | A Km/h OR LOWER | L2 Km/h OR LOWER | L3 Km/h OR LOWER | L5 Km/h OR LOWER | L1 Km/h OR LOWER |
| IC INSTALLED WAY, SA/PA INSTALLED WAY | V NO TRAFFIC JAM | E Km/h OR LOWER | - | - | - | |
| | IV LESS CONGESTION | D Km/h OR LOWER | L2 Km/h OR LOWER | L3 Km/h OR LOWER | L5 Km/h OR LOWER | |
| | III HEAVY CONGESTION | C Km/h OR LOWER | L2 Km/h OR LOWER | L3 Km/h OR LOWER | L5 Km/h OR LOWER | |
| | II LESS TRAFFIC JAM | B Km/h OR LOWER | L2 Km/h OR LOWER | L3 Km/h OR LOWER | L5 Km/h OR LOWER | |
| | I HEAVY TRAFFIC JAM | A Km/h OR LOWER | L2 Km/h OR LOWER | L3 Km/h OR LOWER | L5 Km/h OR LOWER | |

FIG.10
(a)
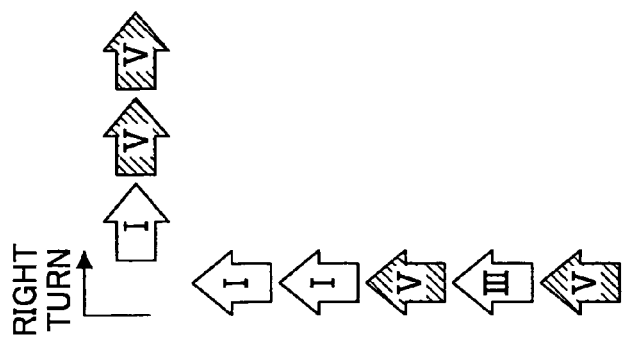
(b)
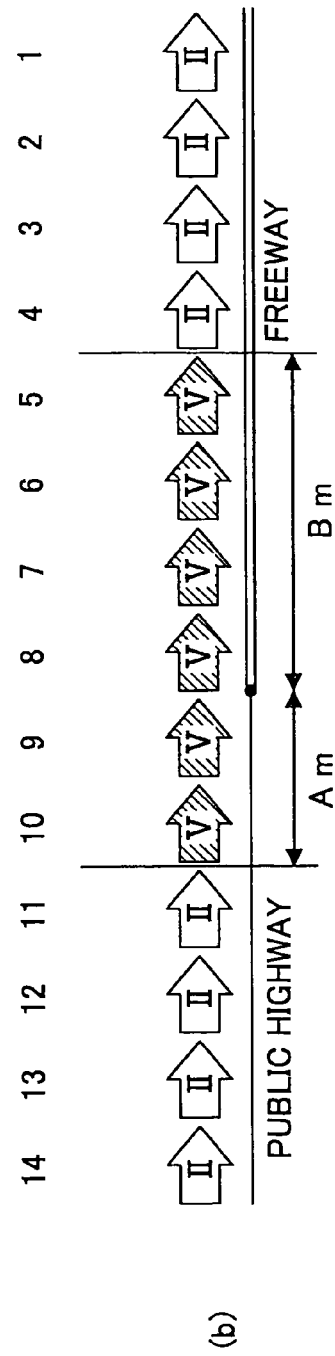

FIG.16
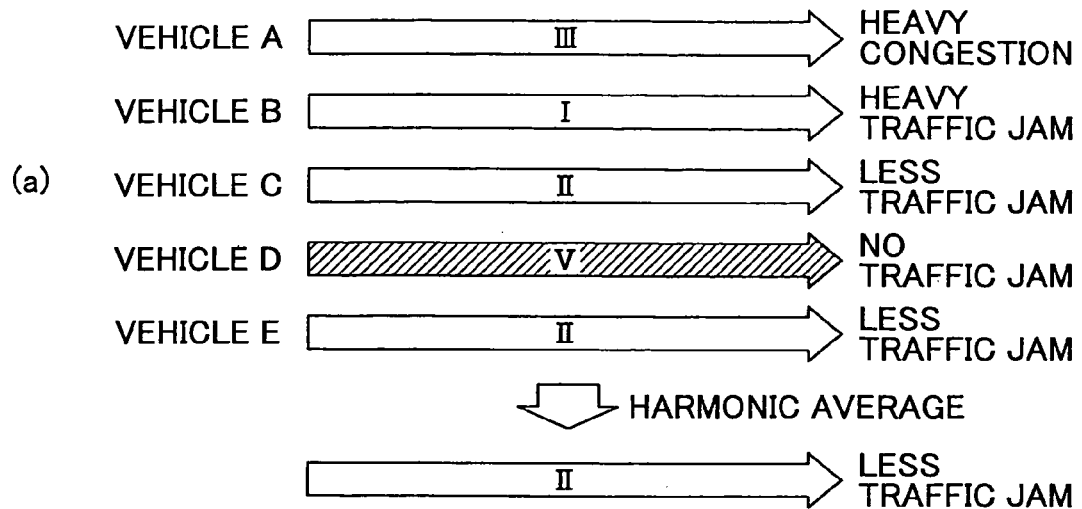
(a)
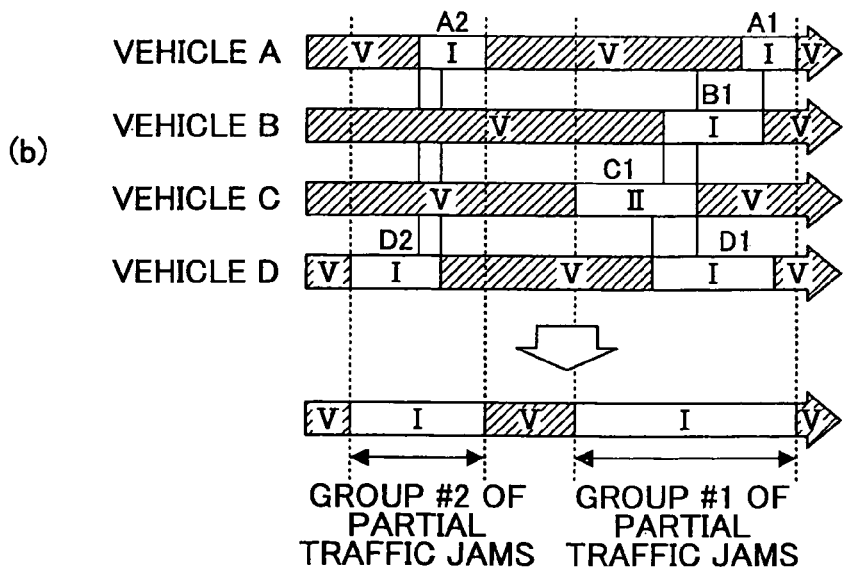
(b)
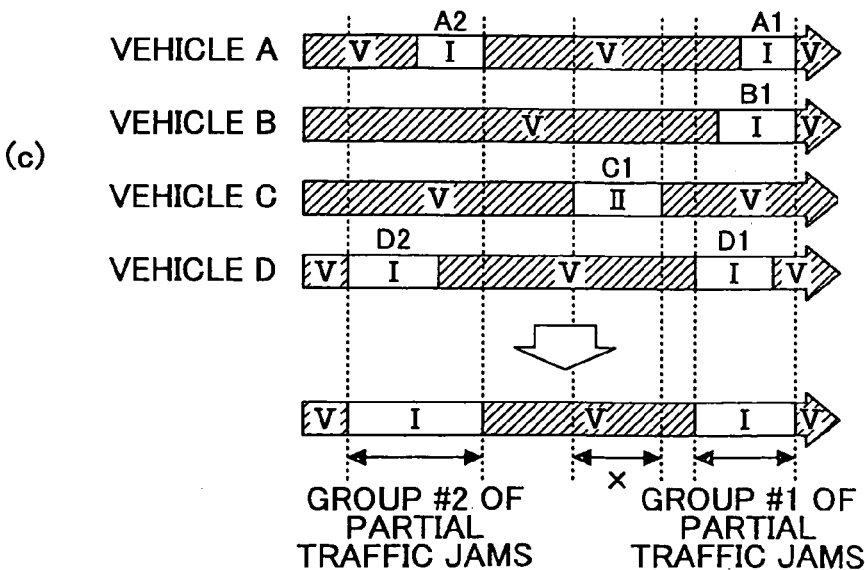
(c)

FIG. 17
(a)
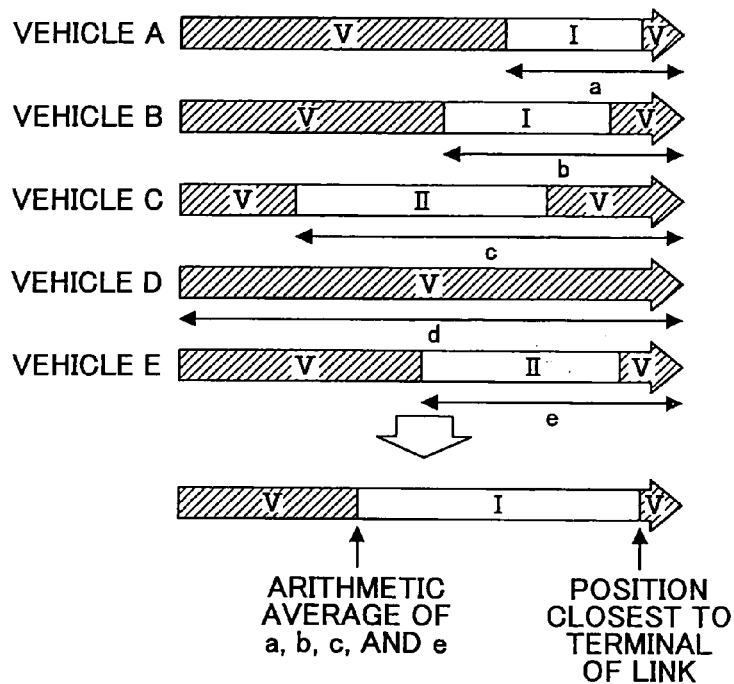
(b)
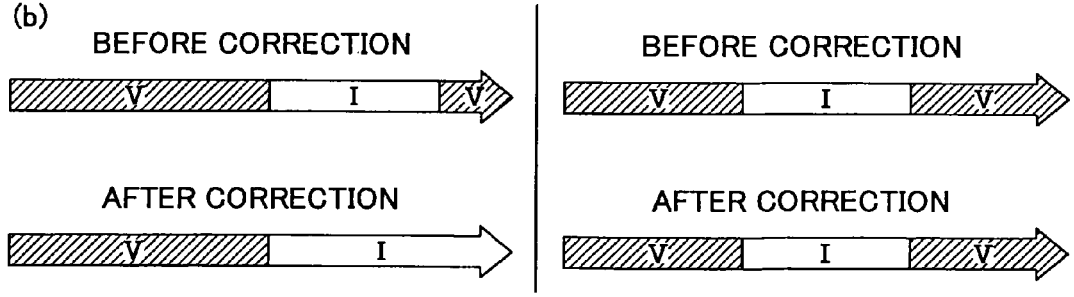
(c)
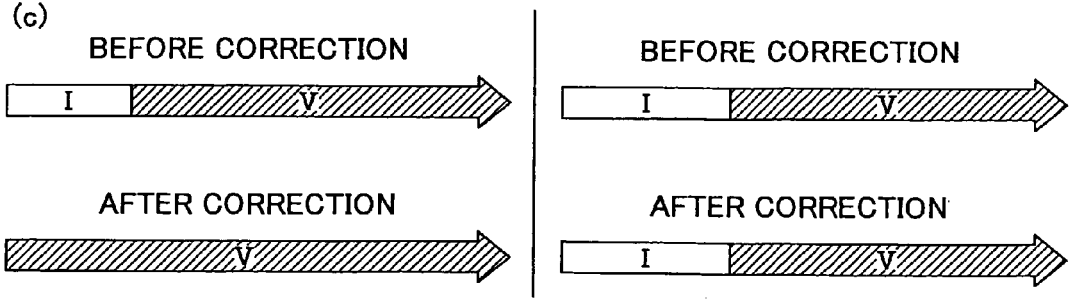

TRAFFIC INFORMATION GENERATION METHOD, TRAFFIC INFORMATION GENERATION DEVICE, AND NAVIGATION SYSTEM

TECHNICAL FIELD

The present invention relates to a traffic information generation method, a traffic information generation device, and a navigation system that totalize information such as speed of a probe car actually running on a road through the probe car or a server to generate traffic information such as a traffic jam.

BACKGROUND ART

A VICS (Vehicle Information and Communication System) and a probe-car information system that collect vehicle information such as speed and time of a vehicle to generate traffic information are known. In the probe-car information system, the running speed and the position of a vehicle on a road where the vehicle has actually run are collected to generate traffic information such as a traffic jam (see, for example, Patent Document 1). In the probe-car information system described in Patent Document 1, a time-series variation in an average speed and a position is calculated based on vehicle information regarding the position of the vehicle and the time thereof to generate traffic jam information. In addition, the vehicle information is sectioned into movement groups at predetermined time intervals so as to be partially overlapped with each other. When the average speed of the movement groups falls within a predetermined speed range, the length of the movement groups is calculated as a traffic jam length or an average speed.

With this configuration, it is possible to eliminate factors irrelevant to a traffic jam, such as the temporal stop of a forward vehicle due to its left turn, right turn, and course change occurring when a pedestrian crosses a road where no traffic signal is installed and the temporal acceleration of the vehicle after the temporal stop, thereby obtaining an exact traffic jam length.

In the probe-car information system described in Patent Document 1, however, standby time at a traffic signal is not eliminated from passing time at a predetermined point such as an intersection. Therefore, the average speed is influenced by the stop of the vehicles at the traffic signal, which results in difficulty in generating high-accuracy traffic jam information.

In light of the above circumstances, the present applicants have proposed a traffic information generation method or the like that eliminates speed reduction by factors other than a traffic jam due to a traffic signal or the like to accurately generate traffic jam information. Patent Document 1: JP-A-2003-281674

DISCLOSURE OF INVENTION

Problems to be Solved by the Invention

The present invention has an object of providing a traffic information generation method obtained by partially modifying the previously proposed traffic information generation method, a traffic information generation device, and a navigation system.

Means for Solving the Problems

The present invention provides a traffic information generation method for generating traffic information for each link, the method including a vehicle speed detection step of detecting a vehicle speed at predetermined distance intervals or at predetermined time intervals using a vehicle speed sensor; and a traffic jam degree detection step of referring to a specified speed and a specified distance prescribed in association with a traffic jam degree representing a level of a traffic jam and a connection determination distance prescribed in accordance with a road type to detect the traffic jam degree corresponding to the vehicle speed. When a link length falls within a predetermined range, information on the traffic jam degree corresponding to a fastest vehicle speed within a prescribed starting point distance from a beginning of the link is allocated to the link.

Advantage of the Invention

A traffic information generation method, a traffic information generation device, and a navigation system, which eliminate reduction in a speed due to factors other than a traffic jam, such as a traffic signal, to generate accurate traffic information, are provided.

BRIEF DESCRIPTION OF THE DRAWINGS

FIGS. 4-(a) and (b) shows the entire configuration diagram of a traffic information generation system and the function block diagram of an in-vehicle unit;

FIG. 6 is a diagram showing a parameter table for setting traffic jam degrees registered for road types;

FIGS. 10-(a) and (b) shows an example of the traffic jam degrees detected when the vehicle turns right;

FIGS. 16-(a), (b) and (c) shows the representative traffic jam degrees on the same link generated by the plural vehicles; and FIGS. 17-(a), (b) and (c) is a diagram for explaining the correction of the link ends of the partial traffic jam degrees.

Figure 1:
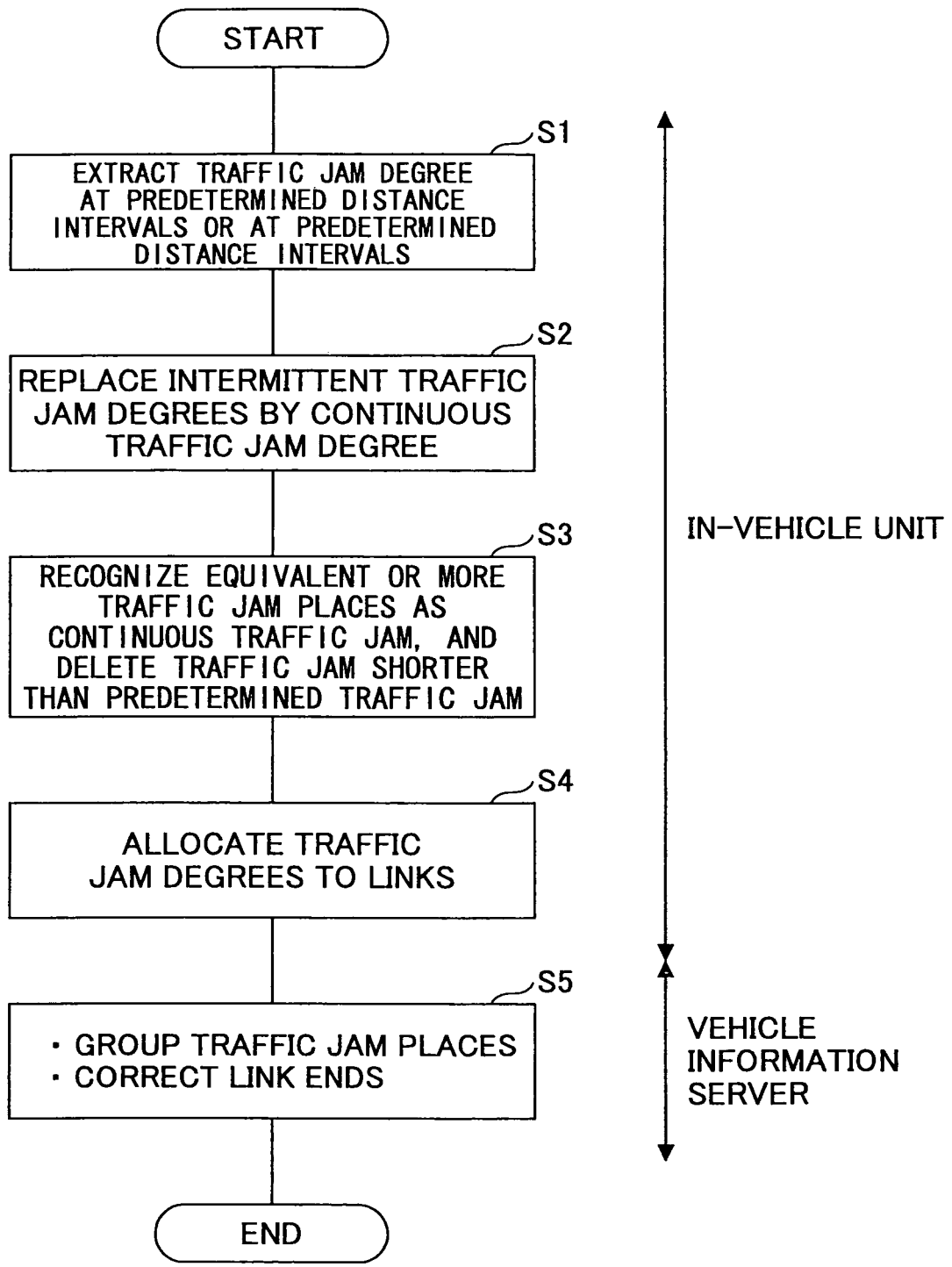
FIG. 1 is a flowchart showing a procedure for generating traffic information.

EXPLANATION FOR REFERENCE NUMBER 2 vehicle
3 base station
4 network
5 vehicle information server
10 in-vehicle unit
11 vehicle speed sensor
12 probe ECU
13 communication unit
14 GPS receiver
15 map data storage unit
16 parameter table
17 display
31 traffic jam degree generation means
32 connected traffic jam determination means and
33 right and left turn determination means
34 traffic jam degree recognition determination means
35 link allocation means
36 traffic jam place grouping means
37 link end correction means
100 traffic information generation system

BEST MODE FOR CARRYING OUT THE INVENTION

Hereinafter, a description is made of the best mode for carrying out the present invention with reference to the accompanying drawings. First, the outline of generating a traffic jam degree is described.

Outline of this Embodiment

Figure 2:
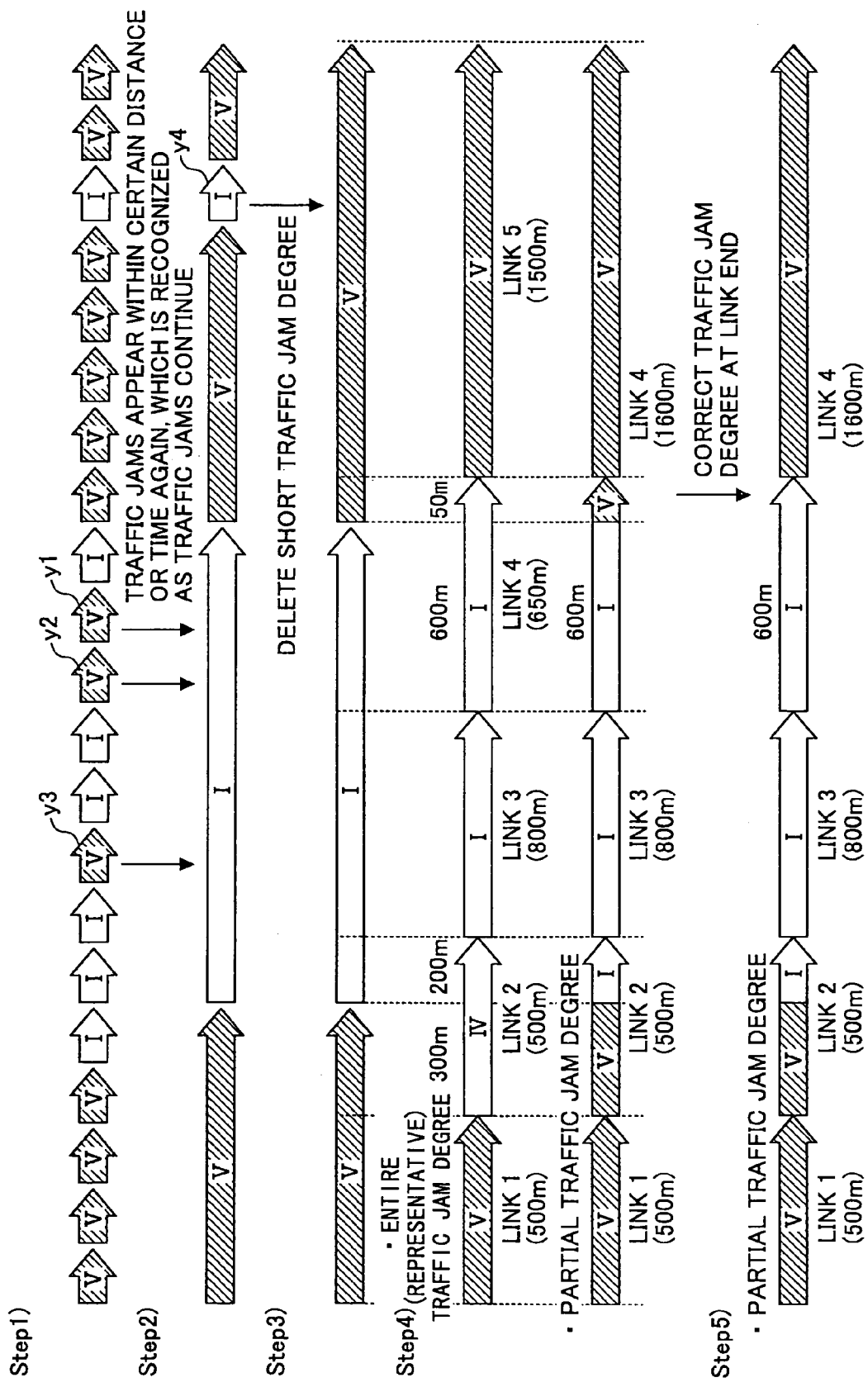
FIG. 2 is a diagram showing how the traffic information is generated for each step.

FIG. 1 is a flowchart showing a procedure for generating traffic information in this embodiment, and FIG. 2 is a diagram showing how the traffic information is generated for each step. The traffic information generation method of this embodiment generates information as to whether and how a road is jammed based on vehicle information on the road where a so-called probe car (hereinafter simply referred to as the vehicle) has run. The vehicle information is information obtained by either detecting a vehicle speed, positional information, a traffic jam degree, or the like from a vehicle 2 or processing them.

Only with the acquisition of the vehicle information and the positional information on the vehicle 2, the traffic information can be generated by any of an in-vehicle unit 10 and a server (for example, a vehicle information server 5) capable of being connected to the vehicle 2. However, since processing the vehicle information with the in-vehicle unit 10 can omit communication processing when only the vehicle information on the vehicle is processed, the vehicle information is preferably processed by the in-vehicle unit 10. On the other hand, when more specific traffic information is generated from the vehicle information on plural of the vehicles 2, the vehicle information is preferably processed by the server. Thus, in this embodiment, steps S1 through S4 among steps S1 through S5 are processed by the in-vehicle unit 10 and step S5 thereamong is mainly processed by the vehicle information server 5.

First, in step 1, the traffic jam degree is acquired at predetermined distance intervals (or at predetermined time intervals). In this embodiment, the traffic jam degree is classified into five states of "no traffic jam," "less congestion," "heavy congestion," "less traffic jam," and "heavy traffic jam." "No traffic jam" indicates the traffic jam degree (state where no traffic jam occurs) at which the vehicle can run without being jammed, while "less congestion," "heavy congestion," "less traffic jam," and "heavy traffic jam" indicate the traffic jam degrees at which the vehicle 2 is jammed more than the state "no traffic jam." Furthermore, a state that the traffic jam degree cannot be classified into any of the states is an "unclear" state.

In the following description, for illustrative purposes, the respective traffic jam degrees are referred to as "V no traffic jam," "IV less congestion," "III heavy congestion," "II less traffic jam," and "I heavy traffic jam" and represented as numerals I through V when they are shown in figures. In other words, the traffic jam degrees include "V no traffic jam" where no traffic jam occurs. In this embodiment, when the traffic jams in the states (traffic jams at the traffic jam degrees I through IV) where the vehicle requires time for running are indicated, they are referred to as jammed, traffic jam, traffic jam place, or a traffic jam state as occasion demands.

In step S1 in FIG. 2, each arrow indicates the traffic jam degree at predetermined distance intervals, and the running speed of the vehicle 2 is indicated by the arrows (on which oblique lines are drawn) each having the numeral V and the arrows each indicating the traffic jam state (I through IV) other than the numeral V. The in-vehicle unit thus acquires the traffic jam degree at predetermined distance intervals (or at predetermined time intervals).

In step S2, the intermittent traffic jams are replaced by the connected traffic jam (are connected to each other). For example, the front and rear sides of the arrows y1, y2, and y3 each indicating "V no traffic jam" are sandwiched by the arrows I each indicating the traffic jam state. Since the vehicle can run without being jammed at the arrows y1, y2, and y3 but the traffic jam occurs again within a certain distance or certain time, it is recognized that the traffic jam continues.

In step S3, a temporarily-occurring short traffic jam is deleted, and it is recognized that the same (or slower vehicle speed) traffic jam continues. For example, the front and rear sides of the arrow y4 indicating the traffic jam state are sandwiched by the arrows each indicating "V no traffic jam." That is, when the short traffic jam occurs between sections where the vehicle can run without being jammed, it is recognized that the state "V no traffic jam" continues. Note that when the same or (slow vehicle speed) traffic jam degrees continue, they are recognized as the continuous traffic jam degree.

Thus, even if a fast vehicle speed state is temporarily acquired during the traffic jam in step S2, it is recognized as the continuous traffic jam. Conversely, even if a slow vehicle speed is temporarily acquired when the vehicle runs without being jammed, it is not recognized as the traffic jam. With this processing, a temporal vehicle speed variation can be eliminated from an acquired vehicle speed to generate an appropriate traffic jam degree.

In step S4, the traffic jam degrees are allocated to links (roads that connect intersections to each other). Since the occurring position of the traffic jam does not directly depend on the separation of the links, the traffic jam degrees and the links are not associated with each other in steps S1 through S3. However, here in step S4, the traffic jam degrees generated in the processing steps until step S3 are allocated to the links.

When the traffic jam degrees are allocated to the links, entire traffic jam degrees and partial traffic jam degrees are generated. The entire traffic jam degree indicates the congested degree of the entire link. The partial traffic jam degree indicates the specific traffic jam degree of the link. For example, the five links in total, which are separated by dotted lines, are shown in FIG. 2. Such link information is obtained from the map data storage unit 15 of a car navigation system. With the allocation of the traffic jam degrees to the links, the congested degrees of the entire links and the specific congested degrees of the links can be detected.

In step S5, the traffic jam degrees at link ends are corrected. In a traffic information generation system 100, since the vehicle speed becomes slower at positions before and after the links when the vehicle 2 stops moving at a traffic signal or starts moving from the traffic signal, the traffic jam degrees at the link ends cannot be exactly detected. Therefore, the traffic jam degrees are corrected in step S5. Furthermore, the processing in step S5 is performed by a vehicle information server 5 described below connected via a network 4.

As described above, in step S1, the actual vehicle speeds rather than an average speed can be used. In step S2, even if the vehicle can run by only the short distances without being jammed, it can be recognized that the traffic jams are connected to each other. Furthermore, in step S3, when the traffic jam distance after the connection of the traffic jams is short, it can be deleted. Therefore, the temporal vehicle speed variation can be eliminated.

In the traffic information generation method of this embodiment, the continuation of the slow vehicle speeds is thus extracted. Therefore, traffic information reflecting actual passing time can be generated.

Furthermore, in step S4, the traffic jam degrees are allocated to the actual roads, and in step S5, the traffic jam degrees at the link ends are corrected. Therefore, displacements in the traffic jam place due to a stop position or the like of the individual vehicle 2 can be corrected.

Characteristic Part of this Embodiment

Meanwhile, as described in detail below, when the vehicle 2 turns right or left to enter another link, the traffic jam degrees are not connected to each other unlike step S2. This is because an influence by speed reduction when the vehicle turns right or left is eliminated. However, if the traffic jam degrees are not connected to each other, the following inconvenience occurs.

Figure 3:
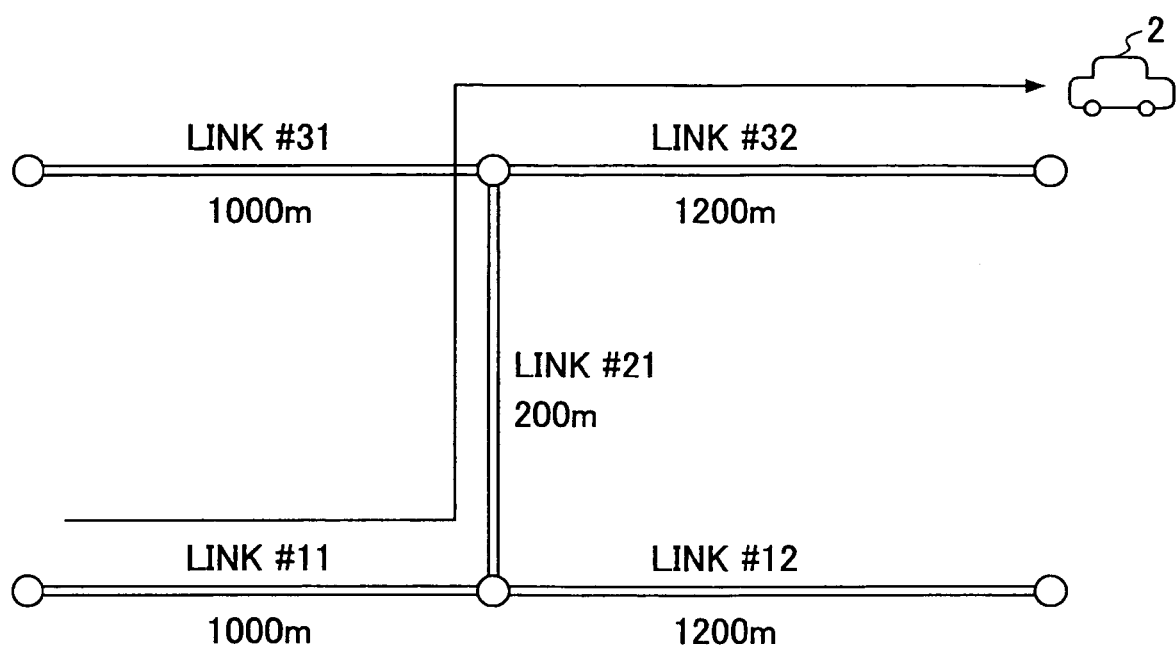
FIG. 3 is a road map for explaining inconvenience when a vehicle turns right or left.

FIG. 3 is a road map for explaining the inconvenience when the vehicle turns right or left. The vehicle 2 runs on the links in the order of the links #11, #21, and #32. However, when the link length of the link #21 is less than or equal to a predetermined length, it is difficult to accurately generate the traffic jam degrees. The vehicle 2 is required to reduce its speed to turn left when entering from the link #11 to the link #21 and required to reduce the speed to turn right when entering from the link #21 to the link #32. As described above, the vehicle is required to reduce the speed at both ends of the link #21. Therefore, when the link length is less than or equal to the predetermined length even if the link #21 is not congested, the traffic jam degree corresponding a slow vehicle speed is allocated in step S2.

In order to prevent this problem, when the link length is less than or equal to the predetermined length, it is conceived to calculate an average speed from the link length and passing time to allocate a corresponding traffic jam degree. However, since the vehicle is required to reduce the speed at the beginning and terminal of the link, the traffic jam degree corresponding to a slow vehicle speed may be allocated.

In this embodiment, when the link length falls within a predetermined range, vehicle information on only a starting point distance (for example, 100 meters) is used to determine the traffic jam degree, and the traffic jam degree corresponding to the fastest vehicle speed within the starting point distance is employed as the traffic jam degree of the corresponding link.

When the traffic jam occurs in the link #21, it can be considered that the link #21 is jammed up to the beginning. Therefore, the traffic jam degree of the entire link #21 can be appropriately determined based on the starting point distance immediately after the vehicle enters the link. When the link is in an unoccupied state, it can be considered that the vehicle speed sufficiently increases while the vehicle runs for the starting point distance even if the vehicle speed is 0 km/h when the vehicle enters the beginning of the link #21. Therefore, an appropriate traffic jam degree can be allocated.

(Traffic Information Generation System 100)

FIG. 4-(a) is the entire configuration diagram of the traffic information generation system 100, and FIG. 4-(b) is the function block diagram of the in-vehicle unit 10. The vehicle 2 has the in-vehicle unit 10 that collects the vehicle information on the vehicle 2, such as a vehicle speed, and can transmit the vehicle information to the vehicle information server 5 as a vehicle information center that processes the vehicle information via a base station 3 and a network 4 and receive from the vehicle information server 5 the traffic jam degree in which the link ends are corrected.

The vehicle information server 5 is connected to the network 4 such as the Internet. Furthermore, the vehicle 2 is configured so that it can perform wired or wireless communications with the base station 3 connected to the network 4. As the mode of a communication system, wired communications through a PSTN (Public Switched Telephone Network), an ISDN (Integrated Services Digital Network), optical fibers, or the like are established from the base station 3 to the vehicle information server 5, and wireless communications through a mobile telephone network, a PHS (Personal Handyphone System) network, a wireless LAN, a WiMAX (Worldwide Interoperability for Microwave Access), beacons, a DSRC (Dedicated Short Range Communications), or the like are established from the base station 3 to the vehicle 2. For transmission and reception of data, a protocol such as a HTTP (Hyper Text Transfer Protocol), a FTP (File Transfer Protocol), and a MIME (Multipurpose Internet Mail Extension) having upward compatibility with a protocol such as a TCP (Transmission Control Protocol)/IP (Internet Protocol) is used.

The in-vehicle unit 10 has a GPS receiver 14 that receives electrical waves from a GPS (Global Positioning System) satellite, a vehicle speed sensor 11 that detects the vehicle speed of the vehicle 2 by using vehicle speed pulses or the like, a communication unit 13 that transmits the vehicle information to the vehicle information center 5 and receives the traffic jam degree from the vehicle information server 5, the map data storage unit 15 that stores a road map, and a probe ECU (Electronic Control Unit) 12 that controls the GPS receiver 14, the vehicle speed sensor 11, the communication unit 13, and the map data storage unit 15. The road map may be stored in the map data storage unit 15 when the vehicle 2 or the car navigation system is shipped or may be stored in the map data storage unit 15 after being downloaded from a predetermined server.

In the map data storage unit 15, road map information such as road networks and intersections is stored so as to be associated with latitudes and longitudes. The road map is constituted as a table-like database in which actual road networks are associated with nodes (points at which roads cross each other, namely, intersections) and links (roads that connect the nodes to each other). Furthermore, the links store road types such as public highways or motor highways, traffic restrictions such as speed limits, and facility information on restaurants.

The probe ECU 12 is constituted as a computer in which a CPU that executes a program, a ROM that stores the program, a RAM that temporarily stores data and the program, and an input/output unit to and from which data are input and output are connected to each other via a bus.

When the CPU of the probe 12 executes the program, traffic jam degree generation means 31, connected traffic jam determination means 32, traffic jam degree recognition determination means 34, and link allocation means 35 are implemented. When the link ends are corrected by the vehicle 2, the program is executed by the CPU of the probe ECU 12 so that traffic jam place grouping means 36 and link end correction means 37 are implemented. Furthermore, in the ROM of the probe ECU 12, a parameter table 16 described below for setting the traffic jam degrees is stored or partially or entirely downloaded from the vehicle information server.

Note that the probe ECU 12 extracts the peripheral road map of the vehicle 2 from the map data storage unit 15 based on the positional information on the vehicle 2 detected by the GPS receiver 14 and displays the extracted road map together with the position of the vehicle 2 on a display 17. At this time, the probe ECU 12 displays traffic information generated by the traffic information generation method of this embodiment, namely, information on how much roads are jammed in such a manner that the roads are colored so as to correspond to the traffic jam degrees.

Figure 5:
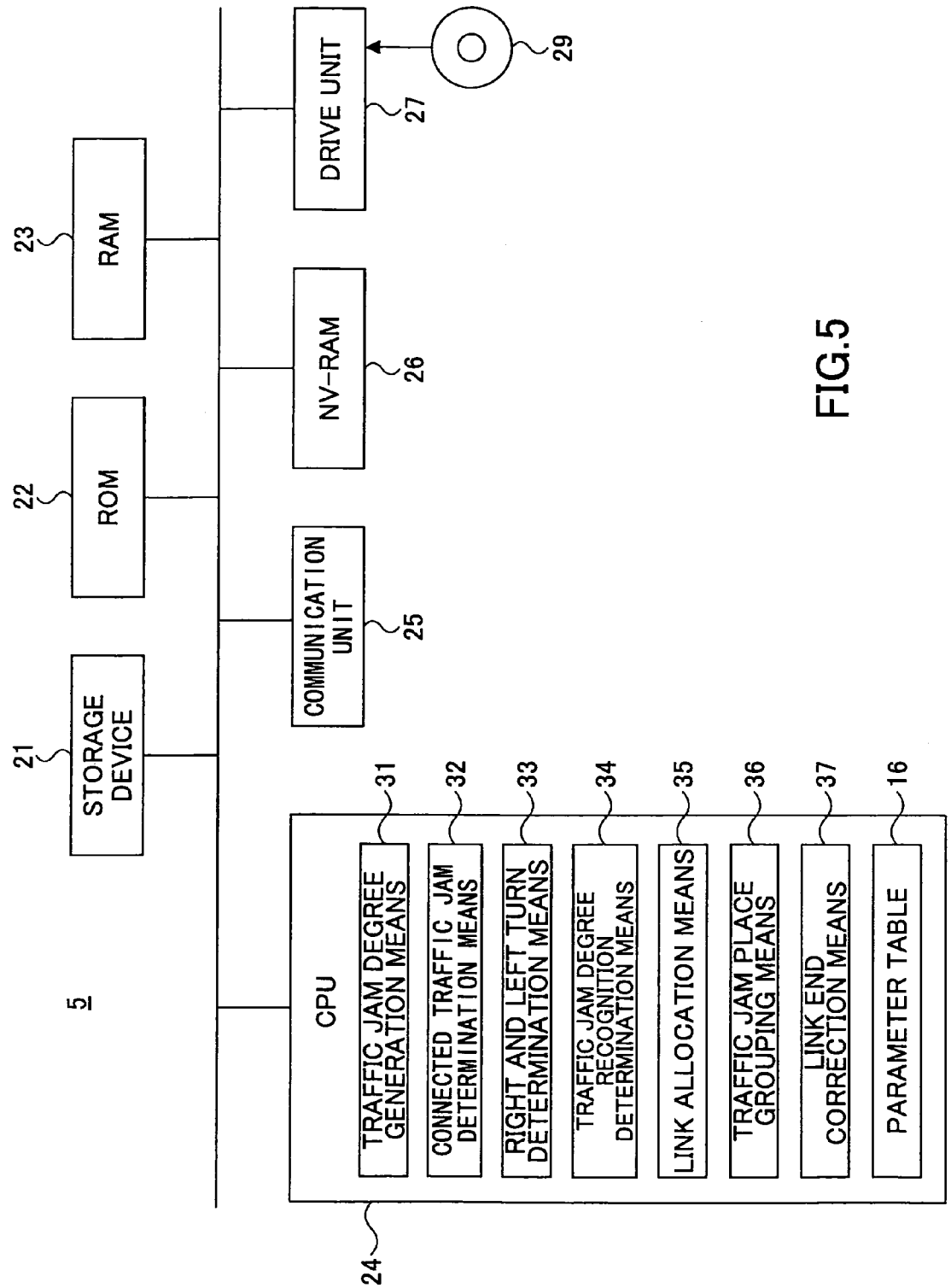
FIG. 5 is the hardware configuration diagram of a vehicle information server.

FIG. 5 is the hardware configuration diagram of the vehicle information server 5. The vehicle information center 5 is configured as a computer in which a storage device (for example, a HDD (Hard Disk Drive)) 21 that stores an OS (Operating System), a program, and files, a ROM 22 that stores a program and drivers, a RAM 23 that temporarily stores data and the programs, a CPU 24 that executes the programs, a communication unit 25 through which a network card or the like is connected to the network 4, a NVRAM (Non Volatile RAM) 26 that stores parameters and the like, a drive unit 27 that reads and writes a storage medium such as a CD-ROM, and the like are connected to each other via a bus 28.

In the storage unit 21 of the vehicle information server 5, the CPU 24 is executed to install the program that implements the traffic jam degree generation means 31, the connected traffic jam determination means 32, the traffic jam degree recognition determination means 34, the link allocation means 35, the traffic jam place grouping means 36, and the link end correction means 37.

When the vehicle information server 5 generates the traffic information of steps S1 through S5, all the programs are executed by the CPU 24. When the vehicle information server 5 implements only step S5, the program that implements the traffic jam place grouping means 36 and the link end correction means 37 is executed. Note that the vehicle information server 5 has a part of or the entire parameter table 16 as occasion demands.

The programs are distributed in a state of being stored in the storage medium 29 or downloaded from the network 4 and installed in the storage unit 21.

With the above configurations, steps S1 through S5 in the method for generating the traffic jam degree are successively described.

(Step S1)

The traffic jam degree generation means 31 acquires the vehicle speed detected by the vehicle speed sensor 11 at predetermined distance intervals (or at predetermined time intervals) while the vehicle 2 runs. When the vehicle speed is acquired at predetermined distance intervals, it is acquired, for example, every 10 meters. When the vehicle speed is acquired at predetermined time intervals, it is acquired, for example, every several seconds (for example, one through five seconds).

The traffic jam degree generation means 31 extracts the traffic jam degree corresponding to the vehicle speed every time it acquires the vehicle speed. FIG. 6 is a diagram showing the parameter table 16 for setting the traffic jam degrees registered for the road types. As the road types, a freeway, a tollway, a public highway, and an IC (Interchange) installed way, a SA (Service Area)/PA (Parking Area) installed way are set. Furthermore, setting speeds, connected traffic jam determination distances, traffic jam degree recognition determination values, partial traffic jam generation target link lengths, and link end correction target ranges are set and registered so as to correspond to the traffic jam degrees ("V no traffic jam," "IV less congestion," "III heavy congestion," "II less traffic jam," and "I heavy traffic jam") for each of the road types. Since the setting speed for setting the traffic jam degree is different for each of the road types, the traffic jam degree suitable for the feeling of a driver can be extracted.

The traffic jam degree generation means 31 refers to the parameter table 16 to extract the traffic jam degree corresponding to the vehicle speed. For example, assuming that the vehicle runs on the public highway, the traffic jam degree "I heavy traffic jam" is extracted when the vehicle speed is less than or equal to A (km/h), the traffic jam degree "II less traffic jam" is extracted when the vehicle speed is less than or equal to B (km/h), the traffic jam degree "III heavy congestion" is extracted when the vehicle speed is less than or equal to C (km/h), the traffic jam degree "IV less congestion" is extracted when the vehicle speed is less than or equal to D (km/h), and the traffic jam degree "V no traffic jam" is extracted when the vehicle speed is less than or equal to E (km/h). Note that in FIG. 6, the relationship $A<B<C<D<E<F<G<H$ is established.

Figure 7:
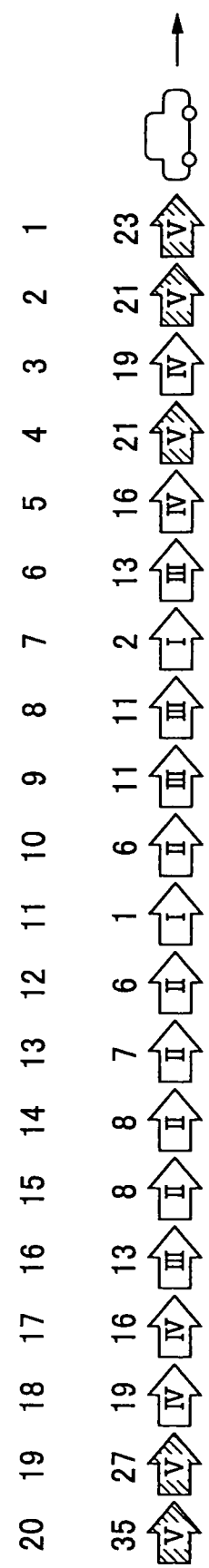
FIG. 7 is a diagram showing the traffic jam degrees extracted in accordance with vehicle speeds as indicated by arrows.

FIG. 7 is a diagram showing the traffic jam degrees extracted in accordance with the vehicle speeds as indicated by arrows. Numerals added above the arrows indicate the vehicle speeds, and numerals inside the arrows indicate the traffic jam degrees extracted in accordance with the vehicle speeds. Note that for illustrative purposes, numerals 1 through 20 are added in the order of acquiring the vehicle speeds. The acquired vehicle speeds and the traffic jam degrees are stored in the RAM of the probe ECU 12 and a part of the map data storage unit 15 as the vehicle information.

As described above, the traffic jam degree is determined based on a vehicle speed at every point rather than based on an average speed, and an instantaneous vehicle speed variation is eliminated as in steps S2 and S3. Thus, the traffic information can be generated without being influenced by a stop at a traffic signal and a temporal vehicle speed variation. For example, when the traffic jam degree is calculated based on an average speed, an instantaneous vehicle speed variation is also included in the average speed. Therefore, it is difficult to distinguish whether the average speed is reduced due to the traffic jam or the traffic signal. However, in this embodiment, when the traffic information is generated, the traffic jam and the traffic signal can be distinguished from each other.

Note that in step S1, "V no traffic jam" is the traffic jam degree at which the vehicle runs the fastest. However, the traffic jam degree at which the vehicle runs much faster than at the traffic jam degree "V no traffic jam" may be defined so as to provide information on a road where the vehicle can run at high speed besides the roads where the traffic jams ("IV less congestion," "III heavy congestion," "II less traffic jam," "I heavy traffic jam") occur.

(Step S2)

In step S2, the connected traffic jam determination means 32 replaces the intermittent traffic jams with the continuous traffic jam based on the traffic jam degrees extracted in step S1. The traffic jam degrees indicating a slow vehicle speed are classified into the four levels of "IV less congestion," "III heavy congestion," "II less traffic jam," and "I heavy traffic jam." However, in step S2, when another traffic jam degree, which is the same as or slower than the corresponding traffic jam degree in the vehicle speed (hereinafter simply referred to as the traffic jam degree the same as or more than the corresponding traffic jam degree in the vehicle speed), appears again within a predetermined distance, the intervening traffic jam degree between the other traffic jam degree and the corresponding traffic jam degree is replaced by the corresponding traffic jam degree.

However, as for the starting point distance from the beginning of the link, the traffic jam degree corresponding to the fastest vehicle speed is employed. When the vehicle comes to the end of the link without running for the starting point distance, it is recognized that the state of the traffic jam degree is unclear. The starting point distance is a predetermined threshold and compared with a running distance from the beginning of the link. The starting point distance is common to each of the links or set for each of the links, and it is stored in the ROM of the probe ECU 12 or downloaded into it.

The "predetermined distance" in step S2 is registered in advance in the parameter table 16 in FIG. 6 as the connected traffic jam determination distance for each of the road types. For example, in the case of "IV less congestion" on the public highway, when another traffic jam degree the same as or more than the traffic jam degree indicating "IV less congestion" appears again within the connected traffic jam determination distance (=L2) even after the traffic jam degree indicating "V no traffic jam" is generated, the intervening traffic jam degree between the other traffic jam degree and the corresponding traffic jam degree is replaced by the corresponding traffic jam degree. In other words, when the traffic jam degree indicating the faster vehicle speed appears within the connected traffic jam determination distance, it is replaced by the corresponding traffic jam degree.

Figure 8:
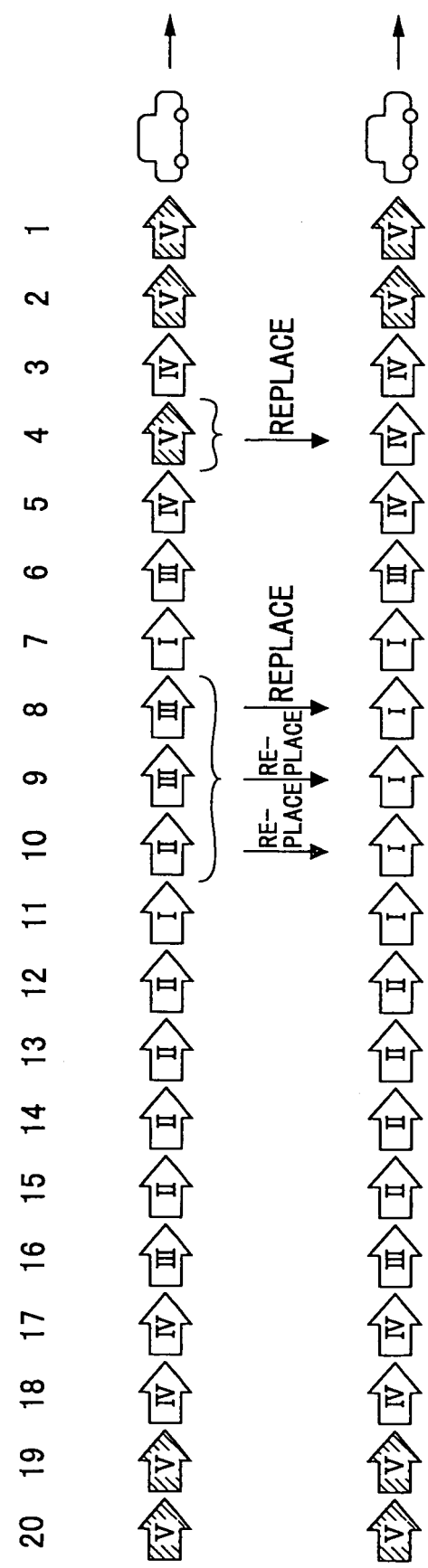
FIG. 8 is a diagram showing a state in which connected traffic jam determination means replaces the traffic jam degrees.

FIG. 8 is a diagram showing a state in which the connected traffic jam determination means 32 replaces the traffic jam degrees. FIG. 8 shows the same traffic jam degrees each indicating a slow vehicle speed as those shown in FIG. 7. Note that the connected traffic jam determination distance L2 of this embodiment is a running distance corresponding to three arrows. Therefore, when another traffic jam degree the same as or more than the corresponding traffic jam degree is detected within the three arrows, the intervening traffic jam degrees are replaced.

In FIG. 8, the traffic jam degree indicating "V no traffic jam" is detected as the fourth vehicle speed after the traffic jam degree indicating "IV less congestion" is detected as the third vehicle speed. However, the traffic jam degree indicating "IV less congestion" is detected again as the fifth vehicle speed. In other words, the traffic jam is eliminated at the fourth vehicle speed, but the traffic jam degree indicating "IV less congestion" is detected again within the connected traffic jam determination distance. Therefore, the fourth traffic jam degree is replaced by the traffic jam degree indicating "IV less congestion."

Furthermore, the traffic jam degrees each indicating "III heavy congestion" and the traffic jam degree indicating "II less traffic jam" are detected as the eighth and ninth vehicle speeds and the tenth vehicle speed, respectively, after the traffic jam degree indicating "I heavy traffic jam" is detected as the seventh vehicle speed. However, the traffic jam degree indicating "I heavy traffic jam" is detected again as the eleventh vehicle speed. In other words, the traffic jams are reduced at the eighth through tenth vehicle speeds, but the traffic jam degree indicating "I heavy traffic jam" is detected within the connected traffic jam determination distance. Therefore, the eighth through tenth traffic jam degrees are replaced by the traffic jam degrees each indicating "I heavy traffic jam."

Figure 9:
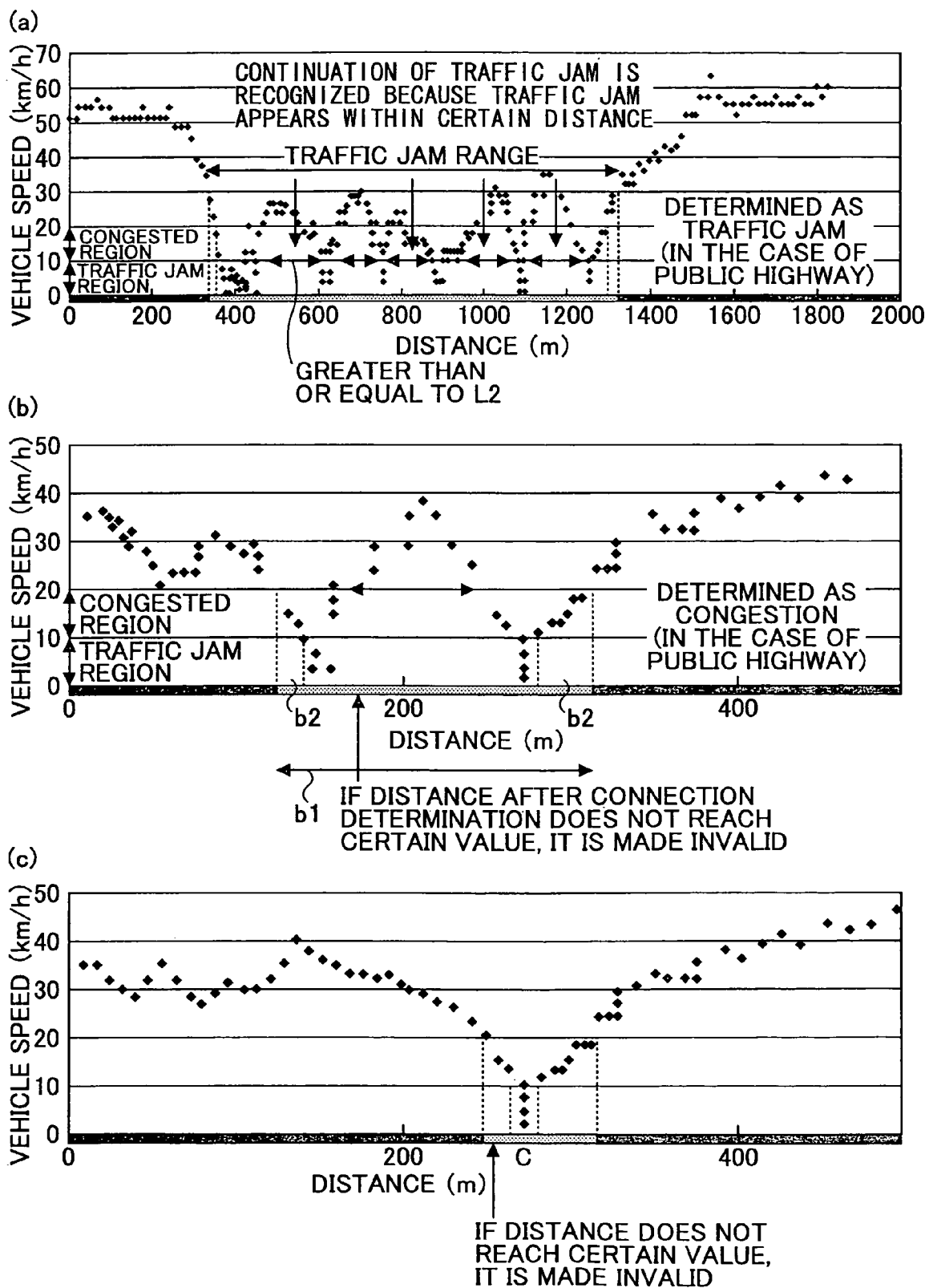
FIGS. 9-(a), (b) and (c) shows examples of a relationship between a running distance and a vehicle speed.

FIG. 9-(a) shows an example of a relationship between a running distance and a vehicle speed. In FIG. 9-(a), slow vehicle speeds are intermittently detected at the running distance of about 300 meters through 1300 meters (hereinafter referred to as a traffic jam range). As shown in FIG. 9-(a), when a region at the vehicle speed of 0 through 10 km/h is defined as a traffic jam region and a region at the vehicle speed of 10 through 20 km/h is defined as a congested region, the traffic jam degree generation means 31 extracts any of the traffic jam degrees "I less congestion," "III heavy congestion," "II less traffic jam," and "I heavy traffic jam" in the traffic jam range.

On the other hand, the vehicle speed indicating "V no traffic jam" is also detected in the traffic jam range, but any of the traffic jam degrees "IV less congestion," "III heavy congestion," "II less traffic jam," and "I heavy traffic jam" is detected again within the connected traffic jam determination distance L2. Therefore, the connected traffic jam determination means 32 recognizes that the traffic jam continues in the traffic jam range. Thus, the intermittent traffic jams are connected to each other, whereby a repeated increasing and reducing speed of the vehicle 2 in a short distance can be recognized as the continuous traffic jam.

(Connection of Traffic Jams When Vehicle Turns Right or left)

Meanwhile, the vehicle 2 detects its vehicle speed at predetermined distance intervals (or at predetermined time intervals) when turning right and left. Therefore, the vehicle 2 detects its reduced vehicle speed when turning right and left. In this case, the vehicle speed is reduced even if no traffic jam occurs. Thus, if the traffic jam degrees at the reduced vehicle speed when the vehicle turns right and left are connected to each other, the traffic jam degrees before and after the vehicle turns right and left may be erroneously replaced. Therefore, in this embodiment, the traffic jam degrees when the vehicle turns right and left are not connected to each other.

FIG. 10-(a) is a diagram showing an example of the traffic jam degrees detected when the vehicle turns right. As shown in FIG. 10-(a), the traffic jam degrees before and after the vehicle turns right are recognized as different groups. If the above condition is met, the connected traffic jam determination means 32 does not connect the traffic jam degrees to each other. A method for determining whether the vehicle has turned right and left is described below. When a right or left turn is detected, the place of the right or left turn is stored in the vehicle information.

Furthermore, the connected traffic jam determination distance is registered for each of the road types. Therefore, when the vehicle runs on roads of the different road types, it is preferred to adjust which connected traffic jam determination distance is applied. FIG. 10-(b) is a diagram showing an example of the traffic jam degrees when the vehicle runs on both the public highway and the freeway.

The traffic jam degrees each indicating "II less traffic jam" are extracted at the first through fourth vehicle speeds and at the eleventh through fifteenth vehicle speeds, and the traffic jam degrees each indicating "V no traffic jam" are extracted at the fifth through tenth vehicle speeds. In order to connect the traffic jam degrees each indicating "II less traffic jam" to each other, the traffic jam degrees each indicating "V no traffic jam" must fall within the connected traffic jam determination distance. However, in FIG. 10-(*b*), the road types are different between the eighth and ninth vehicle speeds. In this case, the connected traffic jam determination distance is adjusted in accordance with the ratio of the road types in this embodiment.

For example, let it be assumed that the running distance on the public highway is A (m) and the running distance on the freeway is B (m). According to the parameter table 16, the connected traffic jam determination distance corresponding to the public highway and "II less traffic jam" is L2, and the connected traffic jam determination distance corresponding to the freeway and "II less traffic jam" is L4. Therefore, the connected traffic jam determination distance of the sections (sections at the fifth through tenth vehicle speeds) is adjusted as follows.

$$\text{Connected traffic jam determination distance} = L2 \times A/(A+B) + L4 \times B/(A+B)$$

Thus, when the vehicle runs on the roads of the different road types, the connected traffic jam determination distance is adjusted in accordance with the ratio of the road types. As a result, the traffic jams occurring, for example, when the road types are changed can be appropriately connected to each other.

Figure 11:
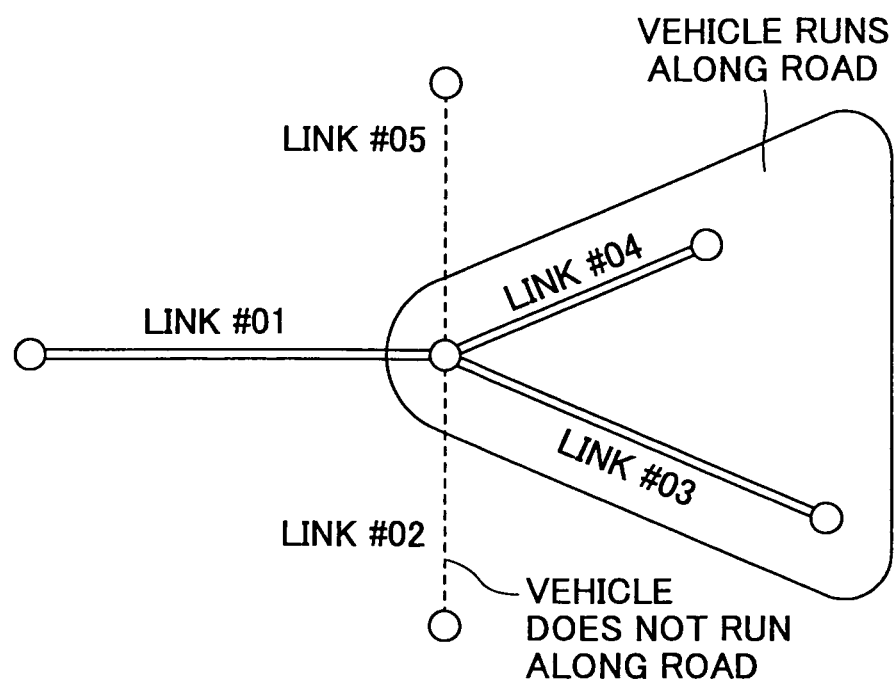
FIG. 11 is a diagram for explaining a determination criterion for determining whether the vehicle has turned right or left.

A determination as to whether the vehicle has turned right or left is made. FIG. 11 is a diagram for explaining a determination criterion for determining whether the vehicle has turned right or left. In FIG. 11, the link #01 is connected to the links #03 and #04 along a road. In this embodiment, when the vehicle enters such links branched along the road, it is not determined that the vehicle has turned right or left. In other words, when a connection angle between the links is less than, for example, plus or minus 30 degrees, it is recognized that the vehicle has not run along the road. Thus, right and left turn determination means 33 determines that the vehicle has turned right or left when any of the following conditions is met.

(a) The vehicle runs along a road not shown on the road map.

(b) The connection angle between the links is greater than or equal to plus or minus 30 degrees.

Therefore, when the vehicle enters from the link #01 to the link #03 or the link #04, it is not determined that the vehicle turns right or left. On the other hand, when the vehicle enters the link #02 or the link #05 as indicated by dotted lines, it is determined that the vehicle turns left or right. Note that as the connection angle, positional information on the vehicle 2 and information on connections between the links stored in the road map may be used or running paths accumulated by an autonomous navigation may be used. Moreover, operational amounts of a steering wheel may be used for determining whether the vehicle turns right or left.

(Processing Beginning of Link)

A description is made of a determination of the traffic jam degree at the beginning of the link where the vehicle having turned right or left enters. Once the vehicle has run for the starting point distance (for example, 100 meters) from the beginning of the link, the intermittent traffic jams may be replaced by the continuous traffic jam degree according to the method described above. However, when the link length of the link where the vehicle having turned right or left enters is less than the connected traffic jam determination distance, the traffic jam degree indicating a slow vehicle speed may be allocated even if the traffic jam does not occur. In view of this, the beginning of the link is processed as follows.

Note that the link length of the link where the vehicle having turned right or left enters can be detected from the road map. However, when the vehicle further turns right or left (to enter a parking area, a shortcut not shown on the road map, or the like) even if the link length of the link where the vehicle enters is greater than or equal to the connected traffic jam determination distance, the link length of the link may be less than the connected traffic jam determination distance for the vehicle. Thus, the traffic jam degree for the starting point distance from the beginning of the link is determined as follows regardless of the link length of the link where the vehicle has entered.

Figure 12:
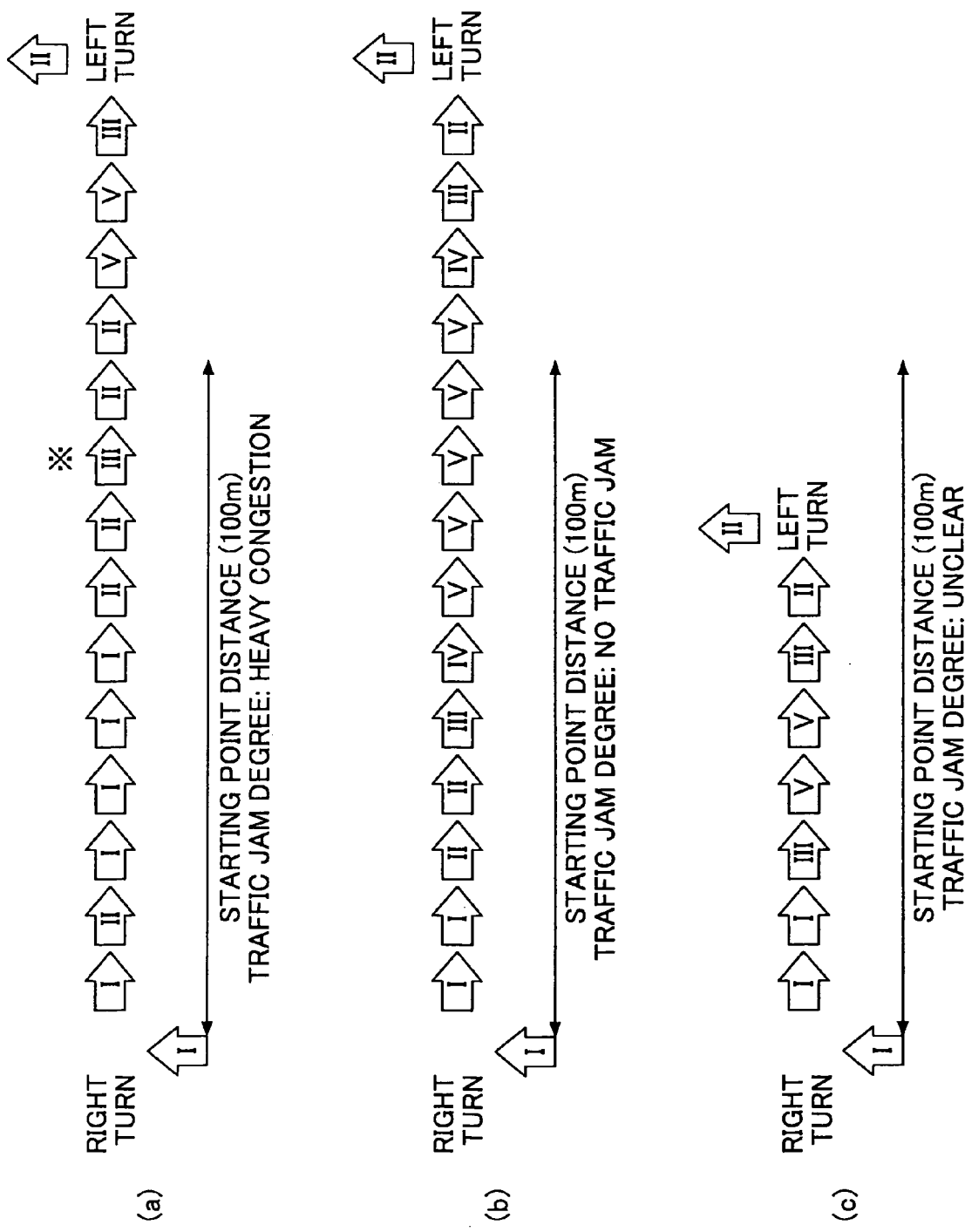
FIGS. 12-(a), (b) and (c) is a diagram showing an example of the traffic jam degrees at the beginning of a link determined by the connected traffic jam determination means.

FIG. 12 is a diagram showing an example of the traffic jam degrees at the beginning of the link determined by the connected traffic jam determination means 32. FIG. 12-(*a*) shows the traffic jam degrees when the fastest vehicle speed within the starting point distance indicates "III heavy congestion" after the vehicle has run for greater than or equal to the starting point distance from the beginning of the link. The vehicle speeds within the starting point distance in FIG. 12-(*a*) are, for example, as follows.

From the beginning of the link
~10 meters: 5 k/h
~20 meters: 12 k/h
~30 meters: 7 k/h
~40 meters: 7 k/h
~50 meters: 3 k/h
~60 meters: 5 k/h
~70 meters: 11 k/h
~80 meters: 13 k/h
~90 meters: 16 k/h*(employed)
~100 meters: 14 k/h
~110 meters: 28 k/h
~120 meters: 25 k/h Within the starting point distance (100 meters), the fastest vehicle speed is 16 k/h at places 80 through 90 meters away from the beginning of the link. Therefore, the connected traffic jam determination means 32 employs the traffic jam degree ("III heavy congestion" in FIG. 12-(*a*)) corresponding to 16 k/h as the traffic jam degree at the starting point distance from the beginning of the link.

FIG. 12-(*b*) shows the traffic jam degrees when the fastest vehicle speed within the starting point distance indicates "V no traffic jam" after the vehicle has run for greater than or equal to the starting point distance from the beginning of the link. In FIG. 12-(*b*), the traffic jam degrees indicating "I heavy traffic jam" also exist within the starting point distance. However, since the traffic jam degree indicating the fastest vehicle speed is "V no traffic jam," "V no traffic jam" becomes the traffic jam degree at the starting point distance from the beginning of the link.

FIG. 12-(*c*) shows the traffic jam degrees when the vehicle comes to the end of the link without running for the starting point distance from the beginning of the link or it enters another link. In FIG. 12-(*c*), the fastest vehicle speed within the starting point distance is "V no traffic jam." However, since the vehicle does not run for the starting point distance, the traffic jam degree is "unclear."

Thus, the traffic jam degree of the link is regarded as follows based on a relationship between the distance at which the vehicle 2 has run after having turned right or left, the starting point distance, and the connected traffic jam determination distance.

A. Less than the starting point distance from the beginning of the link: unclear B. Greater than or equal to the starting point distance from the beginning of the link and less than or equal to the connected traffic jam determination distance: the traffic jam degree corresponding to the fastest vehicle speed within the starting point distance (the distance between the starting point distance and the connected traffic jam determination distance corresponds to the expression "the link length falls within a predetermined range" in claims)

C. Distance is greater than the connected traffic jam determination distance: once the vehicle has run for the connected traffic jam determination distance from the beginning of the link, the intermittent traffic jam degrees are replaced by the continuous traffic jam degree when the traffic jam degrees the same as or more than the corresponding traffic jam degree are detected again within the connected traffic jam determination distance (as described above).

Figure 13:
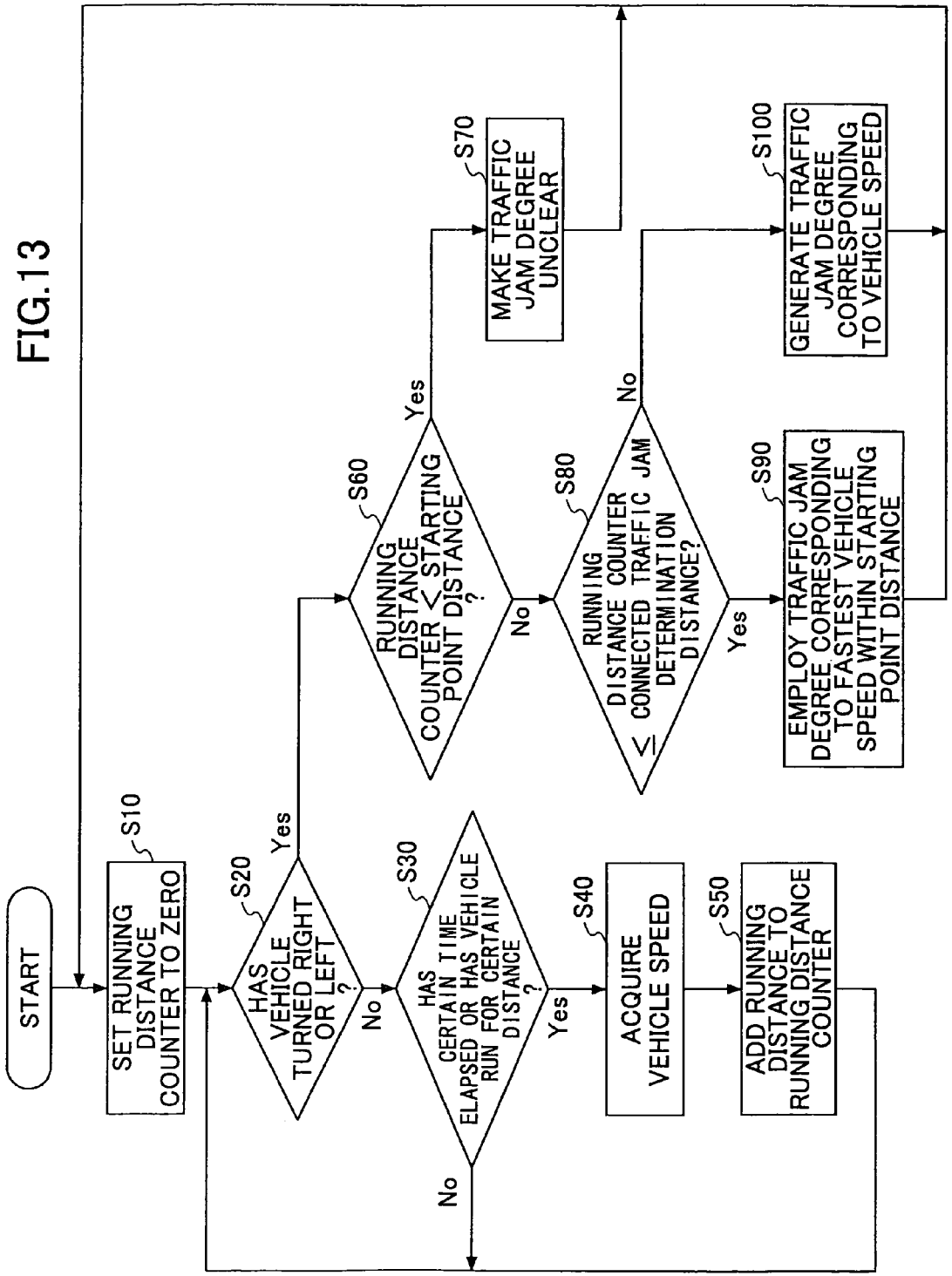
FIG. 13 is a flowchart showing a procedure when the connected traffic jam determination means determines the traffic jam degree at a starting point distance from the beginning of the link.

FIG. 13 is a flowchart showing a procedure when the connected traffic jam determination means 32 determines the traffic jam degree at the starting point distance from beginning of the link. The flowchart shown in FIG. 13 starts, for example, when an ignition is turned on.

The connected traffic jam determination means 32 sets a running distance counter to zero (S10). The running distance counter is a storage unit provided in the RAM or the like, which stores a running distance from a position where a right turn or a left turn is detected.

Next, the right and left turn determination means 33 determines whether the vehicle 2 has turned right or left (S20). When the vehicle has not turned right or left (No in S20), the traffic jam degree generation means 31 determines whether certain time has elapsed or the vehicle has run for a certain distance (S30). When the certain time has not elapsed or the vehicle has not run for the certain distance (No in S30), the determination in step S20 is repeatedly carried out.

When the certain time has elapsed or the vehicle has run for the certain distance (Yes in S30), the traffic jam degree detection means 31 acquires the vehicle speed detected by the vehicle speed sensor 11 (S40) and adds a running distance corresponding to the certain time or the certain distance to the running distance counter (S50).

When the vehicle has turned right or left (Yes in S20), the connected traffic jam determination means 32 determines whether a value of the running distance counter is less than the starting point distance (S60). When the value is less than the starting point distance (Yes in S60), the connected traffic jam determination means 32 determines that the traffic jam degree of the link before the vehicle has turned right or left is unclear (S70).

When the value is not less than the starting point distance (No in S60), the connected traffic jam determination means 32 determines whether the value of the running distance counter is less than or equal to the connected traffic jam determination distance (S80). When the value is less than or equal to the connected traffic jam determination distance (Yes in S80), processing is carried out for preventing the allocation of the traffic jam degree indicating a slow vehicle speed regardless of the vehicle speed.

Thus, the connected traffic jam determination means 32 employs, as the traffic jam degree of the link before the vehicle has turned right or left, the traffic jam degree corresponding to the fastest vehicle speed within the starting point distance after a right turn or a left turn has been detected (S90). For example, assuming that the starting point distance is 100 meters long and the connected traffic jam determination distance is 300 meters long, the traffic jam degree corresponding to the fastest vehicle speed within 100 meters from the beginning of the link is allocated to the link before the vehicle has turned right or left.

When the value is not less than or equal to the connected traffic jam determination distance (No in S80), the traffic jam degree corresponding to the vehicle speed is generated (S100).

With the procedure described above, it is possible to prevent the allocation of the traffic jam degree indicating a slow vehicle speed while no traffic jam occurs at the beginning of the link or the link having a short link length.

The traffic jam degrees connected in the above manner are stored in the RAM of the probe 12 or a part of the map data storage unit 15 as vehicle information.

As described above, the intermittent traffic jams are recognized as the continuous traffic jam, and a temporal rise in the speed of the vehicle is eliminated. Therefore, uncertain information during the traffic jam is eliminated so that reliable traffic information can be generated.

(Step 3)

In step S3, the traffic jam degree recognition determination means 34 deletes a short traffic jam degree from the connected traffic jam degrees and recognizes the continued traffic jams as the continuous traffic jam.

When an isolated traffic jam occurs after the traffic jams are connected to each other in step S2, it is conceived that the vehicle speed is temporarily reduced and an actual traffic jam hardly occurs. Therefore, when the continuous distance of the traffic jam degree is less than a predetermined value, the traffic jam degree at a corresponding place is deleted and replaced by the traffic jam degree indicating "V no traffic jam."

Furthermore, when the traffic jams having the same traffic jam degree continue, the traffic jam degree recognition determination means 34 recognizes them as the continuous traffic jam having the same traffic jam degree. Furthermore, when the traffic jams having the different traffic jam degrees continue, the traffic jam degree recognition determination means 34 recognizes that the traffic jam degrees indicating a slow vehicle speed continue across the traffic jam degree whose vehicle speed is slower than the corresponding traffic jam degrees. For example, when the traffic jam degree indicating "I heavy traffic jam" occurs between the traffic jam degrees indicating "IV less congestion," the traffic jam degree recognition determination means 34 recognizes that the traffic jam degrees indicating "IV less congestion" continue without modifying the traffic jam degree indicating "I heavy traffic jam."

The "predetermined distance" in step S3 is registered in advance in the parameter table 16 in FIG. 6 as a traffic jam degree recognition determination value for each of the road types. For example, in the case of "IV less congestion" on the public highway, when the traffic jam degree recognition determination value is less than L3 (meters), the traffic jam degree indicating "IV less congestion" is deleted and replaced by the traffic jam degree indicating "V no traffic jam."

FIG. 9-(b) shows an example of a relationship between a running distance and a vehicle speed when the traffic jam degrees indicating a slow vehicle speed are detected. When the region at the vehicle speed of 0 through 10 km/h is defined as the traffic jam region and the region at the vehicle speed of 10 through 20 km/h is defined as the congested region, a section b1 has the traffic jam regions adjacent to sections b2 of the two congested regions and the region of "V no traffic jam" sandwiched between the congested regions.

In this case, since the traffic jam region is short (less than the traffic jam degree recognition determination value, it becomes invalid. However, since the continuous congested region is greater than or equal to the traffic jam degree determination value, it becomes invalid.

FIG. 9-(c) shows another example of the relationship between a running distance and a vehicle speed when the traffic jam degrees indicating a slow vehicle speed are detected in a part of the traffic jam degrees indicating "V no traffic jam." In FIG. 9-(c), the vehicle speed is reduced only at the distance C. When the vehicle speed reduced only at such a short distance is detected, the distance is less than or equal to the traffic jam degree recognition determination value. Therefore, since the traffic jam degree is not recognized as any of the traffic jam degrees indicating "IV less congestion" and "III heavy congestion" and the traffic jam degrees indicating "II less traffic jam" and "I heavy traffic jam," it is deleted. With the processing in FIG. 9-(c), a temporal stop at a traffic signal can be eliminated.

Figure 14:
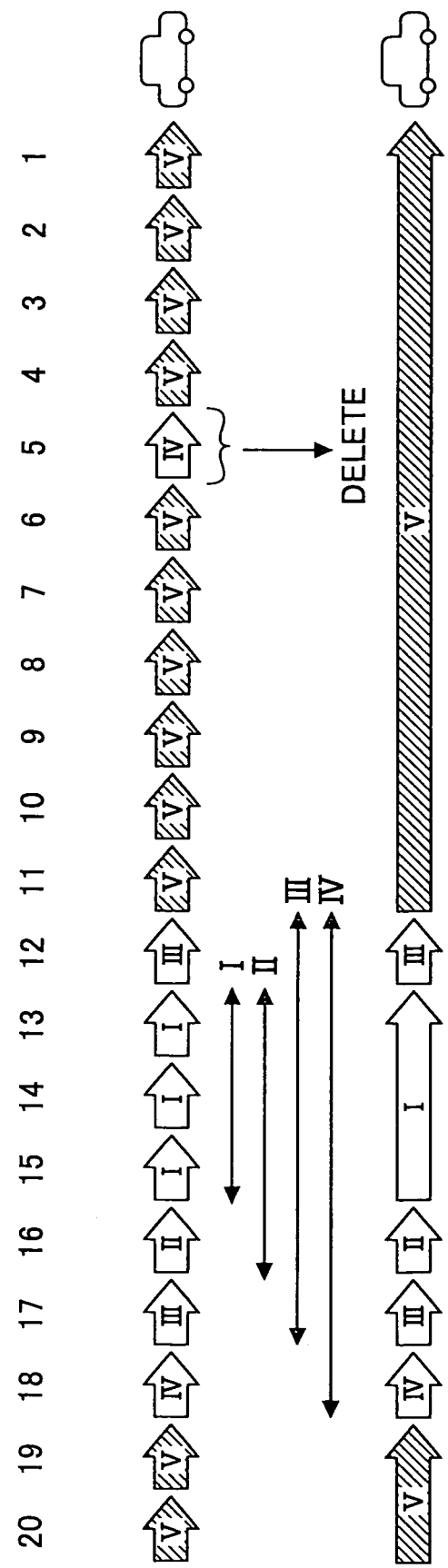
FIG. 14 is a diagram showing a state in which traffic jam degree recognition determination means deletes a short traffic jam degree and recognizes the traffic jam degrees as a continuous traffic jam degree.

FIG. 14 is a diagram showing a state in which the traffic jam degree recognition determination means 34 deletes a short traffic jam degree and recognizes the traffic jam degrees as the continuous traffic jam degree. Note that the traffic jam degrees in FIG. 14 are different from those in FIG. 7 or FIG. 8. Furthermore, the traffic jam degree recognition determination value L3 according to this embodiment is applied when less than three traffic jam degrees are deleted.

In FIG. 14, the traffic jam degree indicating "IV less congestion" is detected in the fifth vehicle speed, but it is deleted because the continuous distance of the traffic jam degree is less than the traffic jam degree recognition determination value. Therefore, the first through eleventh traffic jam degrees are recognized as the traffic jam degrees each indicating "V no traffic jam."

Furthermore, since the thirteenth through fifteenth traffic jam degrees are the traffic jam degrees each indicating "I heavy traffic jams," they are recognized as the continuous traffic jam degree indicating "I heavy traffic jam." Since the sixteenth traffic jam degree is the traffic jam degree indicating "II less traffic jam" and the adjacent thirteenth through fifteenth traffic jam degrees are the traffic jam degrees whose vehicle speed is slower than that of the sixteenth traffic jam degree, the thirteenth through sixteenth traffic jam degrees are recognized as the continuous traffic jam degree indicating "II less traffic jam degree." Since the seventeenth traffic jam degree is the traffic jam degree indicating "III heavy congestion" and the adjacent twelfth through sixteenth traffic jam degrees are the traffic jam degrees whose vehicle speeds are the same as or slower than that of the seventeenth traffic jam degree, the twelfth through seventeenth traffic jam degrees are recognized as the continuous traffic jam degree indicating "III heavy congestion." Since the eighteenth traffic jam degree is the traffic jam degree indicating "IV less congestion" and the adjacent twelfth through seventeenth traffic jam degrees are the traffic jam degrees whose vehicle speeds are slower than that of the eighteenth traffic jam degree, the twelfth through eighteenth traffic jam degrees are recognized as the continuous traffic jam degree indicating "IV less congestion".

As shown in FIG. 14, among the twelfth through eighteenth traffic jam degrees, those recognized as the continuous traffic jam degree are compared with the corresponding traffic jam degree recognition determination values, and the traffic jam degrees greater than or equal to the traffic jam degree recognition determination values are finally recognized as the continuous traffic jam degree. If more than one continuous traffic jam degrees are extracted, the traffic jam degrees indicating a heavier traffic jam degree are preferentially recognized as the continuous traffic jam. In FIG. 14, the thirteenth through fifteenth traffic jam degrees indicating "I heavy traffic jam" are recognized as the continuous traffic jam.

Thus, when the traffic jam degree having a short continuous distance is deleted, temporal reduction in the speed of the vehicle at, for example, a traffic signal can be eliminated.

In step S3, the traffic jam degrees at right and left turns are not recognized as the continuous traffic jam degree in this embodiment to prevent determination of the continuous traffic jam degree due to reduction in the speed of the vehicle at the right and left turns as in the case of step S2.

Furthermore, since the traffic jam degree recognition determination value is registered for each of the road types, it is necessary to adjust what traffic jam degree recognition determination value is applied when the vehicle runs on the different road types. However, in this embodiment, the traffic jam degree recognition determination value is adjusted in accordance with the ratio of the road types as in the case of step S2.

The traffic jam degrees deleted or recognized as the continuous traffic jam degree in this manner are stored in the RAM of the probe ECU 12 and a part of the map data storage unit 15 as vehicle information.

As described above, the temporal speed variation is eliminated to recognize the traffic jam degrees as the continuous one. Thus, a stop at a traffic signal and an instantaneous speed variation are eliminated, whereby traffic information can be generated with high accuracy.

(Step S4)

In step S4, the link allocation means 35 allocates the traffic jam degrees having been subjected to the traffic jam degree recognition determination to the links. With the allocation of the traffic jam degrees to the links, it is possible to detect the traffic jam degrees for each of the links. As for the traffic jam degrees of the links, the links may include the same traffic jam degree as a whole or include some traffic jam degrees. Therefore, the link allocation means 35 generates the traffic jam degree of the entire link (hereinafter referred to as a representative traffic jam degree) and the partial traffic jam degrees in the link. However, when the link length is short, necessity for generating the partial traffic jam degrees is small. Therefore, the partial traffic jam degrees are generated when the link length is greater than or equal to a predetermined distance. Furthermore, the partial traffic jam degrees are not generated when the traffic jam degrees in the links are uniform.

The "predetermined distance" in step S4 is registered as a partial-traffic-jam generation target link length in the parameter table 16 in FIG. 6 for each of the road types. For example, in the case of the public highway, when the partial-traffic-jam generation target link length is greater than or equal to L5 (m), the partial traffic jam degrees are generated.

Figure 15:
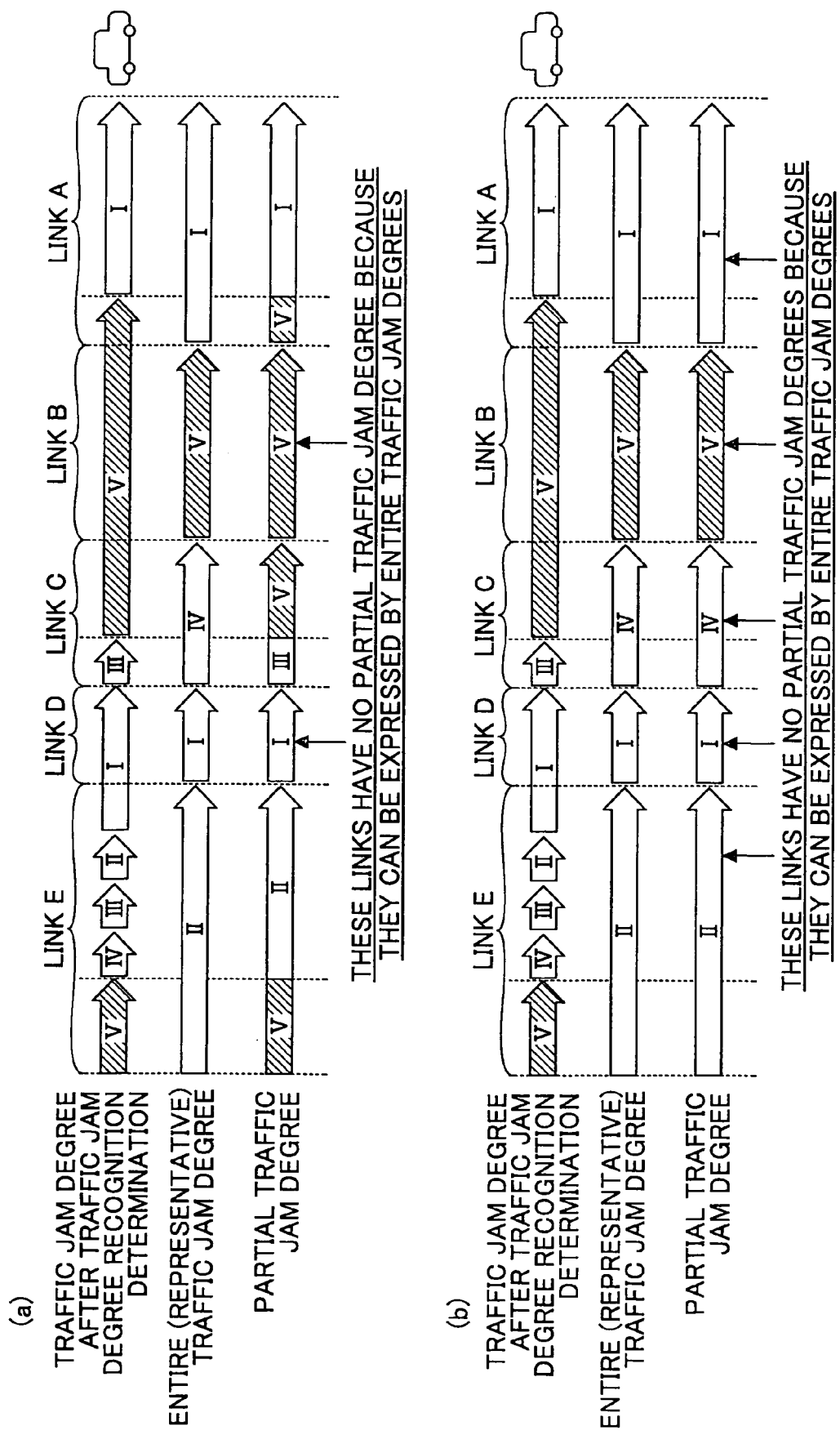
FIGS. 15-(a) and (b) is a diagram showing a state in which link allocation means generates representative traffic jam degrees and partial traffic jam degrees.

FIG. 15 is a diagram showing a state in which the link allocation means 35 generates the representative traffic jam degrees and the partial traffic jam degrees. FIG. 15-(a) shows a case in which each of the link lengths is greater than or equal to the partial-traffic-jam generation target link length, and FIG. 15-(b) shows a case in which each of the link lengths is less than the partial-traffic-jam generation target link length.

The traffic jam degrees in the upper case in FIG. 15-(a) are the traffic jam degrees having been subjected to the traffic jam degree recognition determination in step S3 and divided into the links A through E. Since the link A includes the traffic jam degrees each indicating "I heavy traffic jam" and "V no traffic jam," the link allocation unit 35 generates the representative traffic jam degree of the link A based on the two traffic jam degrees. As a method for calculating the representative traffic jam degree, various statistical processing such as an average and a median value can be employed. In this embodiment, however, the representative traffic jam degree is generated based on a harmonic average.

Accordingly, the link allocation means 35 calculates the representative traffic jam degree of the link A as follows.

The representative traffic jam degree (the link A)=the distance of the link A/{(the distance of "I heavy traffic jam"/the speed of "I traffic jam degree")+(the distance of "V no traffic jam"/the speed of "V no traffic jam")}

Note that in FIG. 15-(a), the harmonic average of the link A is set to be "I heavy traffic jam."

Since the traffic jam degree of the link B is "V no traffic jam" constantly, "V no traffic jam" becomes the representative traffic jam degree. In the link C, "IV less congestion" becomes the representative traffic jam degree based on the harmonic average of "V no traffic jam" and "III heavy congestion." In the link D, since the traffic jam degree is "I heavy traffic jam" constantly, "I heavy traffic jam" becomes the representative traffic jam degree. In the link E, "II less congestion" becomes the representative traffic jam degree based on the harmonic average of "I heavy traffic jam," "II less traffic jam," "III heavy congestion," "IV less congestion," and "V no traffic jam."

Next, the link allocation means 35 essentially generates the partial traffic jam degrees by using the traffic jam degrees having been subjected to the traffic jam degree recognition determination. When the continuous traffic jam state (indicating any of "I heavy traffic jam," "II less traffic jam," "III heavy congestion," "IV less congestion") is detected, the link allocation unit 35 recognizes the state as one traffic jam section and generates the partial traffic jam degrees based on the harmonic average.

In the link A, "I heavy traffic jam" and "V no traffic jam" become the partial traffic jam degrees. In the link B, no traffic jam degree exists. In the link C, "V no traffic jam" and "III heavy congestion" become the partial traffic jam degrees. In the link D, no partial traffic jam degree exists. In the link E, since the traffic jam degrees each indicating "I heavy traffic jam," "II less traffic jam," "III heavy congestion," and "IV less congestion" are continuously detected, they are recognized as one traffic jam section and "V no traffic jam" becomes the partial traffic jam degree. The partial traffic jam degree of the traffic jam section becomes "II less traffic jam" based on the harmonic average.

Then, a description is made of a case in which any of the link lengths is less than the partial-traffic-jam generation target link length. Note that the generation of the representative traffic jam degree is the same even if the link length is less than the partial-traffic-jam generation target link length. Therefore, the description of the generation of the representative traffic jam degree is omitted.

Since all the link lengths in FIG. 15-(b) are less than the partial-traffic-jam generation target link length, the link allocation unit 35 does not generate the partial traffic jam degrees. Accordingly, as shown in FIG. 15-(b), the entire traffic jam degrees are the same as the partial traffic jam degrees.

The representative traffic jam degrees and the partial traffic jam degrees allocated to the links are stored in the RAM of the probe ECU 12 and a part of the map data storage unit 15 as vehicle information.

As described above, with the allocation of the traffic jam degrees to the links, it is possible to handle the traffic jam degrees so as to be associated with the links (roads). Furthermore, since the partial traffic jams in the links can be handled even after the allocation of the traffic jams, traffic information can be recognized in detail.

(Step S5)

In step S5, the traffic jam place grouping means 36 and the link end correction means 37 accurately generate traffic information by using vehicle information on the individual vehicles 2. According to the vehicle information acquired by the processing steps until step S4, traffic jam places are different depending on the stop positions of the individual vehicles 2. Therefore, in step S5, displacements due to the positions of the respective vehicles are corrected using the vehicle information on the plural vehicle 2. Accordingly, the respective vehicles 2 transmit the vehicle information to the vehicle information server 5, and the vehicle information server 5 generates traffic information.

Note that the probe ECUs 12 of the respective vehicles 2 may perform the processing of step S5. In this case, the probe ECUs 12 transmit and receive vehicle information between the vehicles via a known vehicle-to-vehicle communication, a road-to-vehicle communication, or the like.

In step S4, the representative traffic jam degree is acquired for each of the links. When plural vehicles (A through E) run on the same link, they generate their own representative traffic jam degrees. FIG. 16-(a) show the representative traffic jam degrees on the same link generated by the plural vehicles A through E. In one link, the vehicle A detects "IV heavy congestion," the vehicle B detects "I heavy traffic jam," the vehicle C detects "II less traffic jam," the vehicle D detects "V no traffic jam," and the vehicle E detects "II less traffic jam." The traffic jam place grouping means 36 takes the harmonic average to generate the traffic jam degree of the link.

Statistic=the number of samples/{(1/heavy congestion)+(1/heavy traffic jam)+(1/less traffic jam)+(1/no traffic jam)+(1/less traffic jam)}

In FIG. 16-(a), the statistic is set to be "II less traffic jam."

Next, the traffic jam place grouping means 36 generates the specific traffic jam degrees in the link based on the vehicle information on the plural vehicles A through E. The traffic jam place grouping means 36 groups the traffic jam places partially jammed in one link based on the head and tail-end positions of the partial traffic jams of the respective vehicles A through E.

FIG. 16-(b) is a diagram showing the partial traffic jam degrees generated from the vehicle information on the plural vehicle A through E and the state of grouping the partial traffic jam degrees. The traffic jam place grouping means 36 overlaps the partial traffic jam degrees of the respective vehicles A through E with each other to group the overlapped traffic jam places of the traffic jams into a same traffic jam group.

In FIG. 16-(b), the vehicle A has the two partial traffic jam degrees each indicating "I heavy traffic jams" A1 and A2, the vehicle B has the traffic jam degree indicating "I heavy traffic jam," the vehicle C has the partial traffic jam degree indicating "II less traffic jam," and the vehicle D has the two partial traffic jam degrees indicating "I heavy traffic jams" D1 and D2.

When the traffic jam places between the vehicles are compared with each other, there are overlapped parts between A1 and B1, B1 and C1, and C1 and D1. The traffic jam place grouping means 36 groups the overlapped traffic jam places from the tip-end part (A1) to the rear-end part (C1) into one partial traffic jam group.

Similarly, since the traffic jam places of A2 and D2 are overlapped with each other, the traffic jam place grouping means 36 groups the overlapped traffic jam places from the tip-end part (A2) to the rear-end part (D2) into one partial traffic jam group. In FIG. 16-(b), these overlapped traffic jam places are defined as partial traffic jam groups #1 and #2, respectively.

As described above, with the grouping of the partial traffic jam degrees of the plural vehicles A through E, displacements in the traffic jam places due to the stop positions of the vehicle A through E can be eliminated.

On the other hand, however, when the traffic jam place is detected only with one vehicle although the partial traffic jam degrees of the plural vehicles A through E are acquired, the grouping of the partial traffic jam degrees of the vehicles is not performed. In FIG. 16-(c), the respective vehicles A through E include the traffic jam places as in the case of FIG. 16-(b). However, the traffic jam place C1 of the vehicle C is not overlapped with any of the traffic jam places of the other vehicles A, B, D, and E. In other words, when the traffic jam place is detected only with the one vehicle, the traffic jam place grouping means 36 does not group the partial traffic jam degrees of the plural vehicles A through E. In this manner, it is possible to prevent the entire link to be grouped into the traffic jam places due to the linkage of the traffic jam places.

Note that when plural groups are generated in one link, the group having a greater sample number (the number of the vehicles detected as the traffic jam places) is preferentially employed. Furthermore, when the number of the samples is the same, the group having a longer traffic jam place is preferentially employed.

The correction of link ends is described. Even if the partial traffic jams are grouped based on the partial traffic jam degrees of the plural vehicles A through E, vehicle information is not acquired from all the vehicles A through E running on the link. Therefore, the head and tail-end positions of the traffic jam are not detected correctly. Furthermore, the position of the traffic jam is changed.

In view of this circumstance, the head and tail-end positions of the traffic jam and the traffic jam degree are determined as follows.

(a) Head position of the traffic jam: position closest to the terminal of the link among the plural vehicles A through E.

(b) Tail-end position of the traffic jam: an arithmetic average of the positions of the tail ends of the respective vehicles A through E.

(c) Traffic jam degree: a harmonic average of the partial traffic jam degrees of the respective vehicles A through E.

FIG. 17-(a) is a diagram for explaining the head and tail-end positions and the traffic jam degrees of the group of the partial traffic jams. The tail-end position of the traffic jam of the vehicle A is a (m) away from the terminal of the link, the tail-end position of the traffic jam of the vehicle B is b (m) away from the terminal of the link, the tail end position of the traffic jam of the vehicle C is c (m) away from the terminal of the link, and the tail-end position of the traffic jam of the vehicle E is e (m) away from the terminal of the link.

The tail-end positions of the traffic jam are obtained by an arithmetic average of a, b, c, and e. Note that the terminal of the link refers to the tip-end side of arrow.

Furthermore, the vehicle A has "I heavy traffic jam," the vehicle B has "I heavy traffic jam," the vehicle C has "II less traffic jam," the vehicle D has "V no traffic jam," and the vehicle E has "II less traffic jam." The traffic jam places of the group are determined according to the above (a) and (b). Therefore, the traffic jam degree is calculated by the harmonic average as follows.

Traffic jam degree=the number of samples/{(1/heavy traffic jam)+(1/heavy traffic jam)+(1/less traffic jam)+(1/no traffic jam)+(1/less traffic jam)}

In FIG. 17-(a), the result of the harmonic average is set to be a heavy traffic jam.

Next, the link end correction means 37 corrects the traffic jam degrees at the link ends of the partial traffic jam degrees. Note that since the representative traffic jam degree indicates the uniform traffic jam degree in the entire link, it is not necessary to correct the link ends.

Furthermore, in this embodiment, the link ends are corrected after the traffic jam degrees of the plural vehicles A through E are grouped. However, the link ends may be directly corrected from the partial traffic jam degrees of the vehicle 2.

FIG. 17-(b) is a diagram for explaining the correction of the link ends of the partial traffic jam degrees. The link end correction means 37 replaces the traffic jam degree within a predetermined distance from the terminal of the link by the adjacent traffic jam degree.

The "predetermined distance" in step S5 is registered in advance in the parameter table 16 in FIG. 5 as a link end correction target range. The correction of the link end is essentially required when the link has a traffic signal. Therefore, the link end correction target range is registered only for public highways.

In the left diagram in FIG. 17-(b), since the traffic jam degree indicating "I heavy traffic jam" is detected only within the link end correction target range from the terminal of the link, the traffic jam degree up to the terminal of the link is replaced by "I heavy traffic jam." Furthermore, when the traffic jam degree is not detected within the link end correction target range from the terminal of the link as show in FIG. 17-(b), the traffic jam degree is not replaced.

As described above, in the section having small "V no traffic jam" on the side of the terminal of the link, the vehicle waits for a traffic signal to change but it is not a lead vehicle. Therefore, in most cases, the vehicle speed increases when the vehicle passes through the terminal of the link, but the traffic jam actually continues until the terminal of the link. With the correction of the terminal of the link as shown in FIG. 17-(b), the head position of the traffic jam can be detected correctly.

Similarly, when the head position of the partial traffic jam is within the predetermined distance from the beginning of the link, the link end correction means 37 deletes the partial traffic jam.

In the left diagram in FIG. 17-(c), the traffic jam degree indicating "I heavy traffic jam" is detected within the link end correction target range from the beginning of the link, and the traffic jam degree indicating "I heavy traffic jam" is deleted. Furthermore, when the traffic jam degree is detected exceeding the link end correction target range from the beginning of the link, the traffic jam degree is not deleted.

In most cases, the small traffic jam on the side of the beginning of the link occurs due to slow vehicle speed of the vehicle 2 when the vehicle 2 passes through the beginning of the link, because the acceleration of the vehicle 2 having waited for a traffic signal to change in the previous link is insufficient. With the correction of the beginning of the link as shown in the left diagram in FIG. 17-(c), the beginning of the link where the traffic jam does not occur caused can be eliminated from the traffic jam place.

Furthermore, when the traffic jam degrees of the plural vehicles A through E are subjected to statistical processing, the traffic jam positions and the traffic jam degrees of the individual vehicles are smoothened so that the accurate traffic information of the link can be generated.

As described above, the traffic information generation method according to this embodiment eliminates the stop of the vehicle at a traffic signal and the instantaneous variations in the vehicle speed, whereby the accurate traffic information can be generated using the characteristics of the vehicle speed collected via the probe cars.

The present application is based on Japanese Priority Application No. 2007-216273, filed on Aug. 22, 2007, the entire contents of which are hereby incorporated by reference.

The invention claimed is:

1. A traffic information generation method for generating information on a traffic jam degree, by a processor, the information on the traffic jam degree being allocated individually for each of a plurality of links according to a vehicle speed detected when the vehicle travels on a corresponding one of each of the plurality of links, the vehicle speeds being detected by the processor at predetermined distance intervals or at predetermined time intervals, wherein
when a link length is greater than or equal to a distance corresponding to a predetermined lower limit threshold and less than or equal to a distance corresponding to a predetermined upper limit threshold, the traffic jam degree information allocated to the link is based on a fastest vehicle speed detected by the processor within a length from a start point of the link, the length corresponding to the predetermined lower limit threshold.

2. The traffic information generation method according to claim 1, wherein,
when the link length is less than the distance corresponding to the lower limit threshold, it is determined that the information on the traffic jam degree is unclear.

3. The traffic information generation method according to claim 2, wherein
a communication unit transmits the information on the traffic jam to a server.

4. The traffic information generation method according to claim 1, wherein,
when a traveling distance from a beginning of the link is less than the distance corresponding to the lower limit threshold, it is determined that the information on the traffic jam is unclear.

5. The traffic information generation method according to claim 4, wherein
a communication unit transmits the information on the traffic jam to a server.

6. The traffic information generation method according to claim 1, wherein
a communication unit transmits the information on the traffic jam to a server.

7. A traffic information generation device configured to generate information on a traffic jam degree, the information on the traffic jam degree being allocated individually for each of a plurality of links according to a vehicle speed detected when the vehicle travels on a corresponding one of each of the plurality of links, the vehicle speeds being detected at predetermined distance intervals or at predetermined time intervals, wherein
when a link length is greater than or equal to a distance corresponding to a predetermined lower limit threshold and less than or equal to a distance corresponding to a predetermined upper limit threshold, the traffic jam degree information allocated to the link is based on a fastest vehicle speed detected within a length from a start point of the link, the length corresponding to the predetermined lower limit threshold.

8. A navigation system comprising:
a traffic information generation unit configured to generate information on a traffic jam degree, the information on the traffic jam degree being allocated individually for each of a plurality of links according to a vehicle speed detected when the vehicle travels on a corresponding one of the plurality of links, the vehicle speeds being detected at predetermined distance intervals or at predetermined time intervals,
a map data storage unit configured to store a road map of a road where a vehicle travels; and
a positioning unit configured to define a position of the vehicle using electrical waves transmitted from a satellite; wherein,
when a link length is greater than or equal to a distance corresponding to a predetermined lower limit threshold and less than or equal to a distance corresponding to a predetermined upper limit threshold, the traffic information generation unit allocates the information on the traffic jam degree to the link, the allocated information being based on a fastest vehicle speed detected within a length from a start point of the link, the length corresponding to the predetermined lower limit threshold.

* * * * *